United States Patent
Jhu et al.

(10) Patent No.: US 12,425,661 B2
(45) Date of Patent: Sep. 23, 2025

(54) RESIDUAL AND COEFFICIENTS CODING FOR VIDEO CODING

(71) Applicant: BEIJING DAJIA INTERNET INFORMATION TECHNOLOGY CO., LTD., Beijing (CN)

(72) Inventors: Hong-Jheng Jhu, San Diego, CA (US); Xiaoyu Xiu, San Diego, CA (US); Yi-Wen Chen, San Diego, CA (US); Tsung-Chuan Ma, San Diego, CA (US); Che-Wei Kuo, Beijing (CN); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 267 days.

(21) Appl. No.: 18/125,705

(22) Filed: Mar. 23, 2023

(65) Prior Publication Data
US 2023/0291936 A1    Sep. 14, 2023

Related U.S. Application Data

(63) Continuation of application No. PCT/US2021/051700, filed on Sep. 23, 2021.

(60) Provisional application No. 63/085,966, filed on Sep. 30, 2020, provisional application No. 63/082,452, filed on Sep. 23, 2020.

(51) Int. Cl.
| | |
|---|---|
| *H04N 19/91* | (2014.01) |
| *H04N 19/174* | (2014.01) |
| *H04N 19/46* | (2014.01) |
| *H04N 19/70* | (2014.01) |

(52) U.S. Cl.
CPC ......... *H04N 19/91* (2014.11); *H04N 19/174* (2014.11); *H04N 19/46* (2014.11); *H04N 19/70* (2014.11)

(58) Field of Classification Search
CPC ...... H04N 19/91; H04N 19/174; H04N 19/46; H04N 19/70
USPC ..................................... 375/240.26
See application file for complete search history.

(56) References Cited

U.S. PATENT DOCUMENTS

| | | |
|---|---|---|
| 2014/0307800 A1 | 10/2014 | Sole Rojals et al. |
| 2015/0078443 A1 | 3/2015 | Kolesnikov |
| 2016/0295214 A1* | 10/2016 | Gamei .......... H04N 19/91 |

(Continued)

FOREIGN PATENT DOCUMENTS

| | | |
|---|---|---|
| CN | 104221288 A | 12/2014 |
| CN | 105474641 A | 4/2016 |

(Continued)

OTHER PUBLICATIONS

Bross et al. (Versatile Video Coding [Draft 10], JVET Jun. 22-Jul. 1, 2020) (Year: 2020).*

(Continued)

*Primary Examiner* — Matthew David Kim
(74) *Attorney, Agent, or Firm* — Arch & Lake LLP

(57) ABSTRACT

Methods, apparatuses, and non-transitory computer-readable storage mediums are provided for video decoding. A decoder may receive a video stream. The decoder may receive a control flag in a slice header level. The decoder may receive at least one syntax element in the slice header level. The decoder may entropy decode the video bitstream based on the control flag and the at least one syntax element.

20 Claims, 12 Drawing Sheets

(56) References Cited

U.S. PATENT DOCUMENTS

| | | | |
|---|---|---|---|
| 2017/0318314 A1 | 11/2017 | Lu | |
| 2018/0316913 A1* | 11/2018 | Jun | H04N 19/176 |
| 2020/0036968 A1* | 1/2020 | Misra | H04N 19/184 |
| 2020/0177882 A1* | 6/2020 | Yoo | H04N 19/18 |
| 2020/0275121 A1 | 8/2020 | Zhao et al. | |
| 2020/0296390 A1 | 9/2020 | Chao et al. | |
| 2021/0021841 A1* | 1/2021 | Xu | H04N 19/157 |
| 2021/0084314 A1* | 3/2021 | Salehifar | H04N 19/61 |
| 2021/0144391 A1* | 5/2021 | Poirier | H04N 19/96 |
| 2022/0141466 A1* | 5/2022 | Chen | H04N 19/12 375/240.12 |
| 2022/0337811 A1* | 10/2022 | Choi | H04N 19/105 |
| 2022/0337812 A1* | 10/2022 | Rusanovskyy | H04N 19/174 |
| 2023/0102088 A1* | 3/2023 | Choi | H04N 19/30 375/240.26 |
| 2023/0291906 A1* | 9/2023 | Jhu | H04N 19/124 |
| 2024/0298011 A1* | 9/2024 | Naser | H04N 19/463 |

FOREIGN PATENT DOCUMENTS

| | | |
|---|---|---|
| CN | 107925764 A | 4/2018 |
| KR | 20160032119 A | 3/2016 |
| KR | 20180006495 A | 1/2018 |
| WO | 2022108978 A1 | 5/2022 |

OTHER PUBLICATIONS

Hong-Jheng Jhu et al., "CE-2.1:Slice based Rice parameter selection for transform skip residual coding",Joint Video Experts Team (JVET) of ITU-T SG 16 WP 3 and ISO/IEC JTC 1/SC 29, Document:JVET-V0054-r1,22nd Meeting,by teleconference,Apr. 20-28, 2021.(6P).

Sharp, "On slice header flags related to residual coding(JVET-S0093)J.Samuelsson,S.Deshpande,F.Bossen, A.Segall (Sharp Labs of America)", downloaded by EPO at May 22, 2020.(12P).

Hongtao Wang et al., "CE3-related:Simplification of rice parameter derivation", Joint Video Experts Team (JVET) of ITU-T SG 16 WP 3 and ISO/IEC JTC 1/SC 29/WG 11,Document: JVET-Q0490-v3, 17th Meeting:Brussels,BE,Jan. 7-17, 2020.(9P).

Benjamin Bross et al., "Versatile Video Coding (Draft 10)", Joint Video Experts Team (JVET) of ITU-T SG 16 WP 3 and ISO/IEC JTC 1/SC 29/WG 11, : JVET-S2001-vHG, 19th Meeting: by teleconference,Jun. 22-Jul. 1, 2020,(551p).

Sony Corporation, Takeshi Tsukuba. et al.,"CE3-related: Rice Parameter Derivation with Unified Lookup Table", Joint Video Experts Team (JVET) of ITU-T SG 16 WP 3 and ISO/IEC JTC 1/SC 29/WG 11,JVET-Q0137-v3, 17th Meeting: Brussels, BE, Jan. 7-17, 2020, (8p).

Jianle Chen, et al.,"Algorithm description for Versatile Video Coding and Test Model 10 (VTM 10)", Joint Video Experts Team (JVET) of ITU-T SG 16 WP 3 and ISO/IEC JTC 1/SC 29/WG 11, JVET-S2002-v1, 19th Meeting: by teleconference, Jun. 22-Jul. 1, 2020,(99p).

International Search Report of PCT Application No. PCT/US2021/051700 dated Jan. 3, 2022 (3p).

* cited by examiner

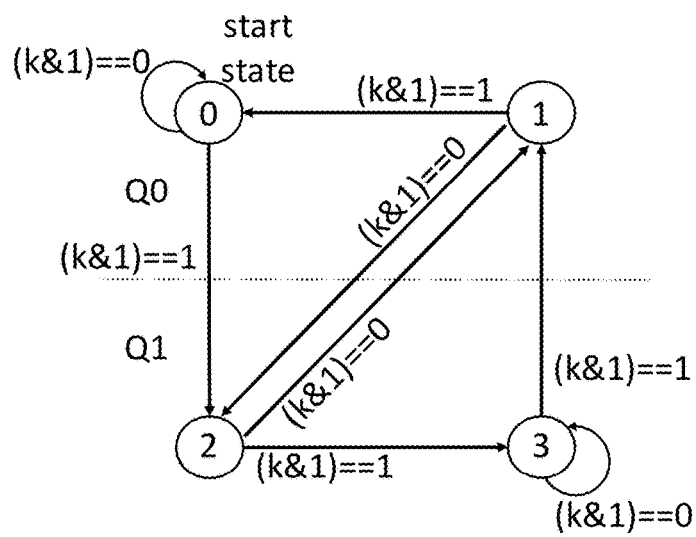
FIG. 10A  FIG. 10B
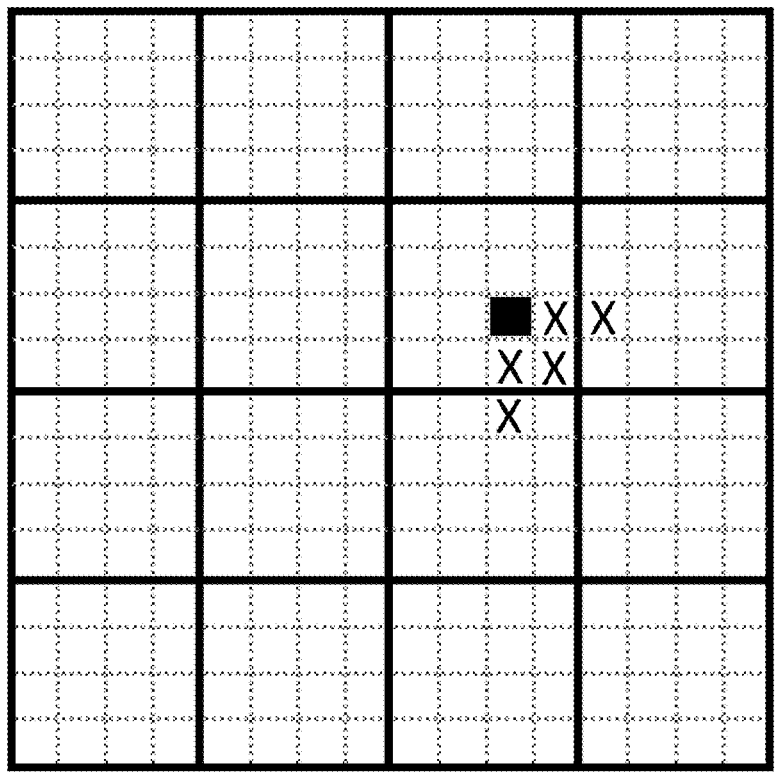
FIG. 11

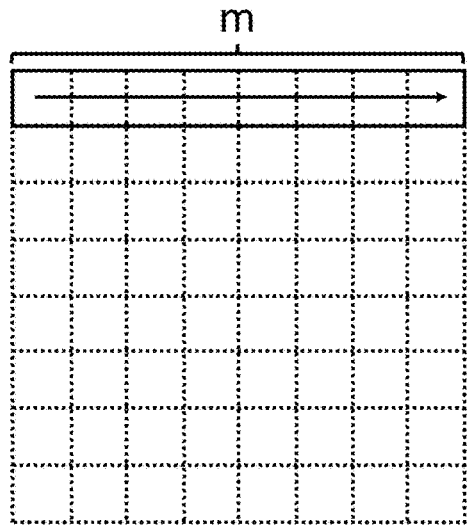
FIGS. 14A
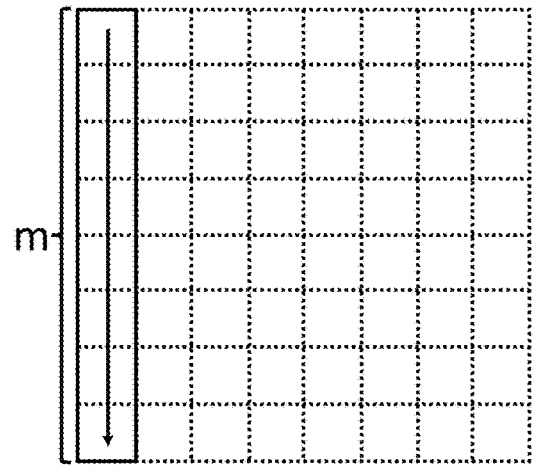
FIGS. 14B
FIGS. 15A
FIGS. 15B

RESIDUAL AND COEFFICIENTS CODING FOR VIDEO CODING

CROSS-REFERENCE TO RELATED APPLICATIONS

This application is a continuation application of PCT application No. PCT/US2021/051700 filed on Sep. 23, 2021, which is based upon and claims priority to Provisional Applications No. 63/085,966 filed on Sep. 30, 2020, and 63/082,452 filed on Sep. 23, 2020, the entire contents thereof are incorporated herein by reference for all purposes.

TECHNICAL FIELD

This disclosure is related to video coding and compression. More specifically, this disclosure relates to the improvements and simplifications of the residual and coefficients coding for video coding.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

Examples of the present disclosure provide methods and apparatus for residual and coefficients coding in video coding.

According to a first aspect of the present disclosure, a method for video decoding is provided. The method may include a decoder receiving a video bitstream. The decoder may further receive a control flag in a slice header level. The control flag may signal whether a rice parameter is enabled for a transform skip slice. The decoder may also receive at least one syntax element in the slice header level. The at least one syntax element is signaled for the transform skip slice and indicates the rice parameter. The decoder may further entropy decode the video bitstream based on the control flag and the at least one syntax element.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 10A is an n illustration of state transition, according to an example of the present disclosure.

FIG. 10B is an illustration of quantizer selection, according to an example of the present disclosure.

FIG. 11 is an illustration of a template used for selecting probability models, according to the present disclosure.

FIG. 14A is an illustration of a horizontal traverse scan, according to the present disclosure.

FIG. 14B is an illustration of a vertical traverse scan, according to the present disclosure.

FIG. 15A is an illustration of a sub-block-based index map scanning for a palette, according to the present disclosure.

FIG. 15B is an illustration of a sub-block-based index map scanning for a palette, according to the present disclosure.

DETAILED DESCRIPTION

Figure 1:
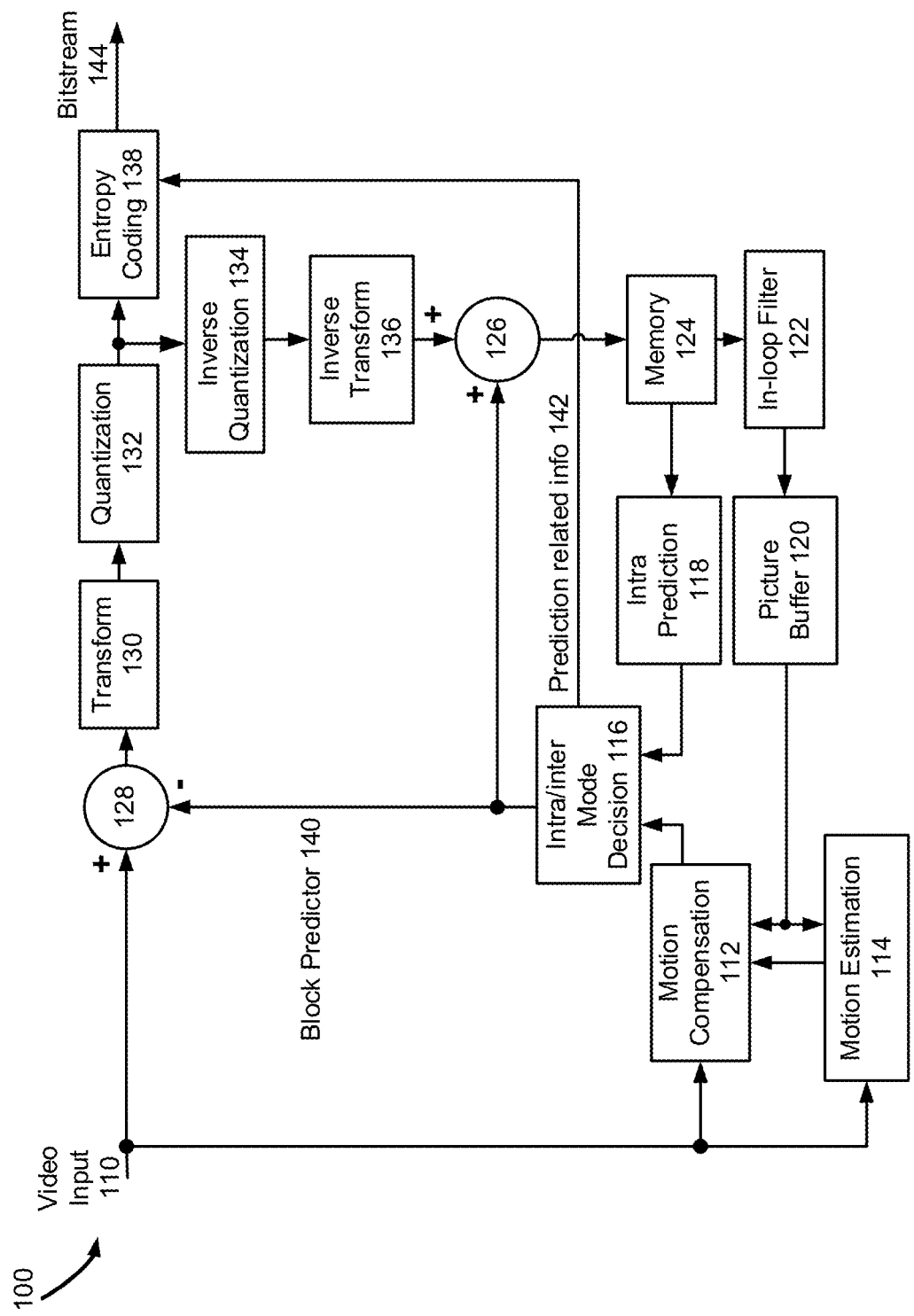
FIG. 1 is a block diagram of an encoder, according to an example of the present disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc., may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. one Joint Video Exploration Team (JVET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard.

Like HEVC, the VVC is built upon the block-based hybrid video coding framework.

FIG. 1 shows a general diagram of a block-based video encoder for the VVC. Specifically, FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In the encoder 100, a video frame is partitioned into a plurality of video blocks for processing. For each given video block, a prediction is formed based on either an inter prediction approach or an intra prediction approach.

A prediction residual, representing the difference between a current video block, part of video input 110, and its predictor, part of block predictor 140, is sent to a transform 130 from adder 128. Transform coefficients are then sent from the Transform 130 to a Quantization 132 for entropy reduction. Quantized coefficients are then fed to an Entropy Coding 138 to generate a compressed video bitstream. As shown in FIG. 1, prediction related information 142 from an intra/inter mode decision 116, such as video block partition info, motion vectors (MVs), reference picture index, and intra prediction mode, are also fed through the Entropy Coding 138 and saved into a compressed bitstream 144. Compressed bitstream 144 includes a video bitstream.

In the encoder 100, decoder-related circuitries are also needed in order to reconstruct pixels for the purpose of prediction. First, a prediction residual is reconstructed through an Inverse Quantization 134 and an Inverse Transform 136. This reconstructed prediction residual is combined with a Block Predictor 140 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. The temporal prediction signal for a given coding unit (CU) or coding block is usually signaled by one or more MVs, which indicate the amount and the direction of motion between the current CU and its temporal reference. Further, if multiple reference pictures are supported, one reference picture index is additionally sent, which is used to identify from which reference picture in the reference picture storage, the temporal prediction signal comes from.

Motion estimation 114 intakes video input 110 and a signal from picture buffer 120 and output, to motion compensation 112, a motion estimation signal. Motion compensation 112 intakes video input 110, a signal from picture buffer 120, and motion estimation signal from motion estimation 114 and output to intra/inter mode decision 116, a motion compensation signal.

After spatial and/or temporal prediction is performed, an intra/inter mode decision 116 in the encoder 100 chooses the best prediction mode, for example, based on the rate-distortion optimization method. The block predictor 140 is then subtracted from the current video block, and the resulting prediction residual is de-correlated using the transform 130 and the quantization 132. The resulting quantized residual coefficients are inverse quantized by the inverse quantization 134 and inverse transformed by the inverse transform 136 to form the reconstructed residual, which is then added back to the prediction block to form the reconstructed signal of the CU. Further in-loop filtering 122, such as a deblocking filter, a sample adaptive offset (SAO), and/or an adaptive in-loop filter (ALF) may be applied on the reconstructed CU before it is put in the reference picture storage of the picture buffer 120 and used to code future video blocks. To form the output video bitstream 144, coding mode (inter or intra), prediction mode information, motion information, and quantized residual coefficients are all sent to the entropy coding unit 138 to be further compressed and packed to form the bitstream.

FIG. 1 gives the block diagram of a generic block-based hybrid video encoding system. The input video signal is processed block by block (called coding units (CUs)). In VTM-1.0, a CU can be up to 128×128 pixels. However, different from the HEVC which partitions blocks only based on quad-trees, in the VVC, one coding tree unit (CTU) is split into CUs to adapt to varying local characteristics based on quad/binary/ternary-tree. By definition, coding tree block (CTB) is an N×N block of samples for some value of N such that the division of a component into CTBs is a partitioning. CTU includes a CTB of luma samples, two corresponding CTBs of chroma samples of a picture that has three sample arrays, or a CTB of samples of a monochrome picture or a picture that is coded using three separate colour planes and syntax structures used to code the samples. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure. As shown in FIGS. 3A, 3B, 3C, 3D, and 3E, there are five splitting types, quaternary partitioning, horizontal binary partitioning, vertical binary partitioning, horizontal ternary partitioning, and vertical ternary partitioning.

Figure 3A:
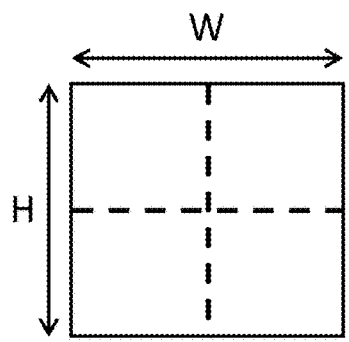
FIG. 3A is a diagram illustrating block partitions in a multi-type tree structure, according to an example of the present disclosure.
Figure 3B:
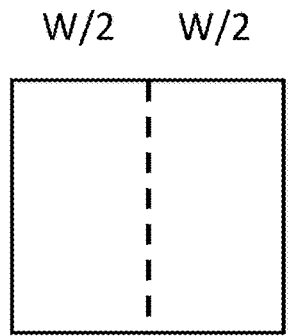
FIG. 3B is a diagram illustrating block partitions in a multi-type tree structure, according to an example of the present disclosure.
Figure 3C:
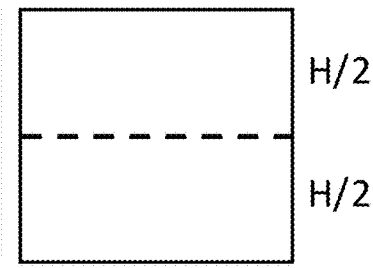
FIG. 3C is a diagram illustrating block partitions in a multi-type tree structure, according to an example of the present disclosure.
Figure 3D:
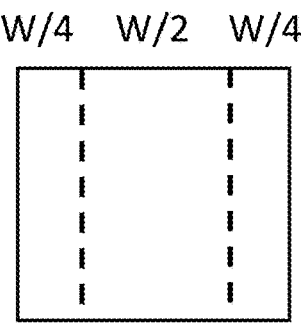
FIG. 3D is a diagram illustrating block partitions in a multi-type tree structure, according to an example of the present disclosure.
Figure 3E:
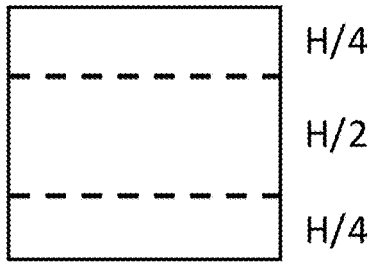
FIG. 3E is a diagram illustrating block partitions in a multi-type tree structure, according to an example of the present disclosure.

FIG. 3A shows a diagram illustrating block quaternary partition in a multi-type tree structure. FIG. 3B shows a diagram illustrating block vertical binary partition in a multi-type tree structure. FIG. 3C shows a diagram illustrating block horizontal binary partition in a multi-type tree structure, in accordance with the present disclosure. FIG. 3D shows a diagram illustrating block vertical ternary partition in a multi-type tree structure. FIG. 3E shows a diagram illustrating block horizontal ternary partition in a multi-type tree structure.

In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes. After spatial and/or temporal prediction, the mode decision block in the encoder chooses the best prediction mode, for example, based on the rate-distortion optimization method. The prediction block is then subtracted from the current video block; and the prediction residual is de-correlated using transform and quantized. The quantized residual coefficients are inverse quantized and inverse transformed to form the reconstructed residual, which is then added back to the prediction block to form the reconstructed signal of the CU. Further in-loop filtering, such as deblocking filter, sample adaptive offset (SAO) and adaptive in-loop filter (ALF) may be applied on the reconstructed CU before it is put in the reference picture store and used to code future video blocks. To form the output video bitstream, coding mode (inter or intra), prediction mode information, motion information, and quantized residual coefficients are all sent to the entropy coding unit to be further compressed and packed to form the bitstream.

Figure 2:
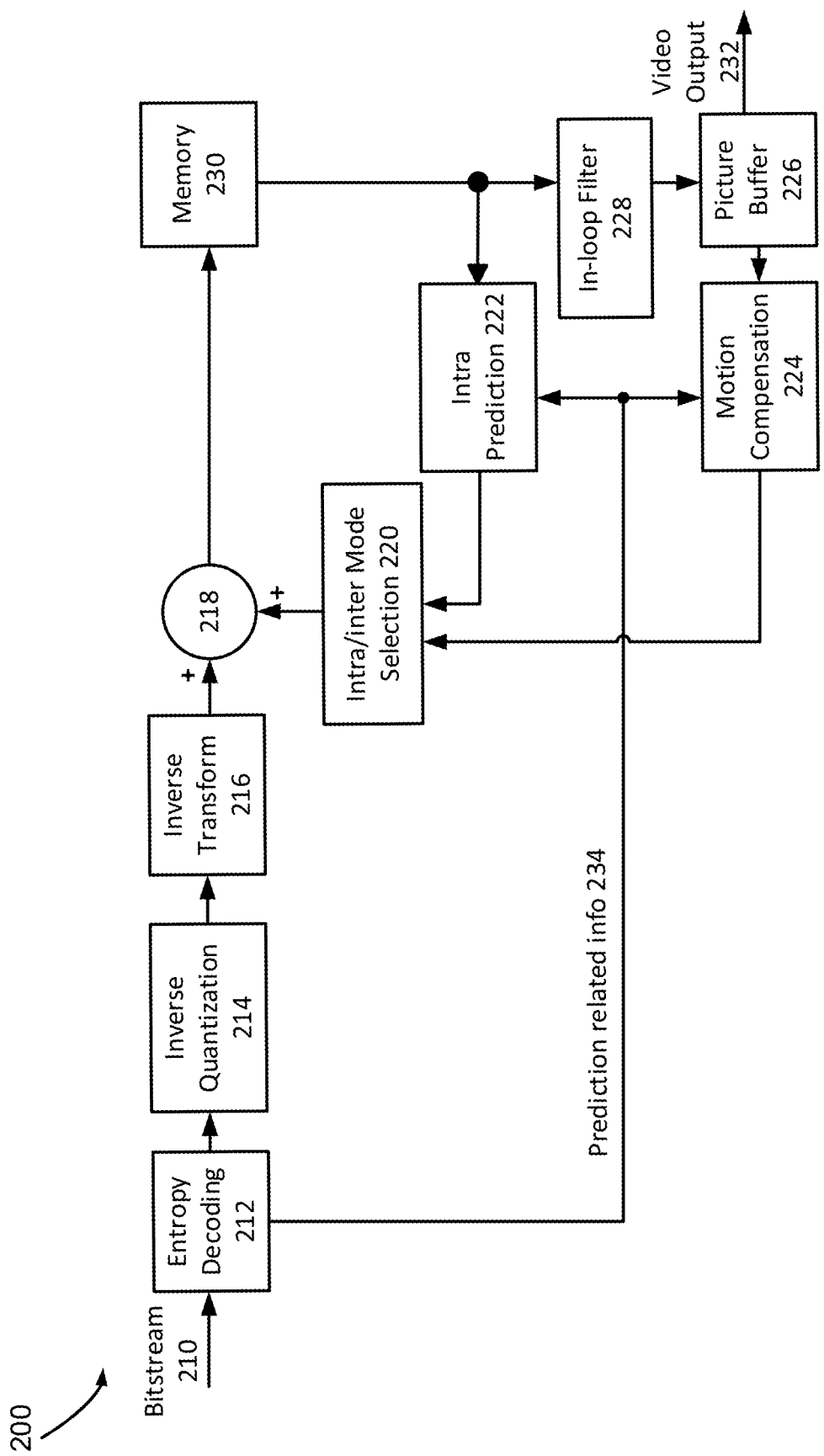
FIG. 2 is a block diagram of a decoder, according to an example of the present disclosure.

FIG. 2 shows a general block diagram of a video decoder for the VVC. Specifically, FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232.

Decoder 200 is similar to the reconstruction-related section residing in the encoder 100 of FIG. 1. In the decoder 200, an incoming video bitstream 210 is first decoded through an Entropy Decoding 212 to derive quantized coefficient levels and prediction-related information. The quantized coefficient levels are then processed through an Inverse Quantization 214 and an Inverse Transform 216 to obtain a reconstructed prediction residual. A block predictor mechanism, implemented in an Intra/inter Mode Selector 220, is configured to perform either an Intra Prediction 222 or a Motion Compensation 224, based on decoded prediction information. A set of unfiltered reconstructed pixels is obtained by summing up the reconstructed prediction residual from the Inverse Transform 216 and a predictive output generated by the block predictor mechanism, using a summer 218.

The reconstructed block may further go through an In-Loop Filter 228 before it is stored in a Picture Buffer 226, which functions as a reference picture store. The reconstructed video in the Picture Buffer 226 may be sent to drive a display device, as well as used to predict future video blocks. In situations where the In-Loop Filter 228 is turned on, a filtering operation is performed on these reconstructed pixels to derive a final reconstructed Video Output 232.

FIG. 2 gives a general block diagram of a block-based video decoder. The video bitstream is first entropy decoded at entropy decoding unit. The coding mode and prediction information are sent to either the spatial prediction unit (if intra coded) or the temporal prediction unit (if inter-coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out to drive a display device, as well as used to predict future video blocks.

In general, the basic intra prediction scheme applied in the VVC is kept the same as that of the HEVC, except that several modules are further extended and/or improved, e.g., intra sub-partition (ISP) coding mode, extended intra prediction with wide-angle intra directions, position-dependent intra prediction combination (PDPC) and 4-tap intra interpolation.

Partitioning of Pictures, Tile Groups, Tiles, and CTUs in VVC

In VVC, tile is defined as a rectangular region of CTUs within a particular tile column and a particular tile row in a picture. Tile group is a group of an integer number of tiles of a picture that are exclusively contained in a single NAL unit. Basically, the concept of tile group is the same as slice as defined in HEVC. For example, pictures are divided into tile groups and tiles. A tile is a sequence of CTUs that cover a rectangular region of a picture. A tile group contains a number of tiles of a picture. Two modes of tile groups are supported, namely the raster-scan tile group mode and the rectangular tile group mode. In the raster-scan tile group mode, a tile group contains a sequence of tiles in tile raster scan of a picture. In the rectangular tile group mode, a tile group contains a number of tiles of a picture that collectively form a rectangular region of the picture. The tiles within a rectangular tile group are in the order of tile raster scan of the tile group.

Figure 4:
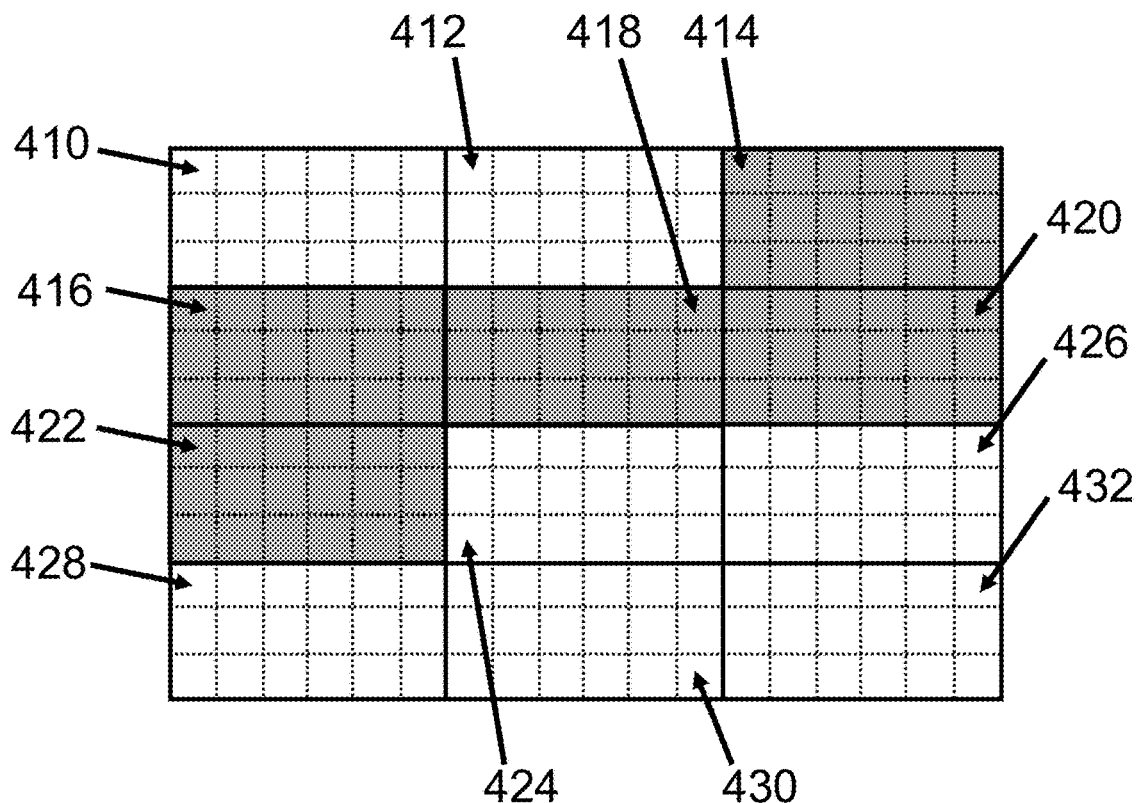
FIG. 4 is a diagram illustration of a picture with 18 by 12 luma CTUs, according to an example of the present disclosure.

FIG. 4 shows an example of raster-scan tile group partitioning of a picture, where the picture is divided into 12 tiles and 3 raster-scan tile groups. FIG. 4 includes tiles 410, 412, 414, 416, and 418. Each tile has 18 CTUs. More specifically, FIG. 4 shows a picture with 18 by 12 luma CTUs that is partitioned into 12 tiles and 3 tile groups (informative). The three tile groups are as follows (1) the first tile group includes tiles 410 and 412, (2) the second tile group includes tiles 414, 416, 418, 420, and 422, and (3) the third tile group includes tiles 424, 426, 428, 430, and 432.

Figure 5:
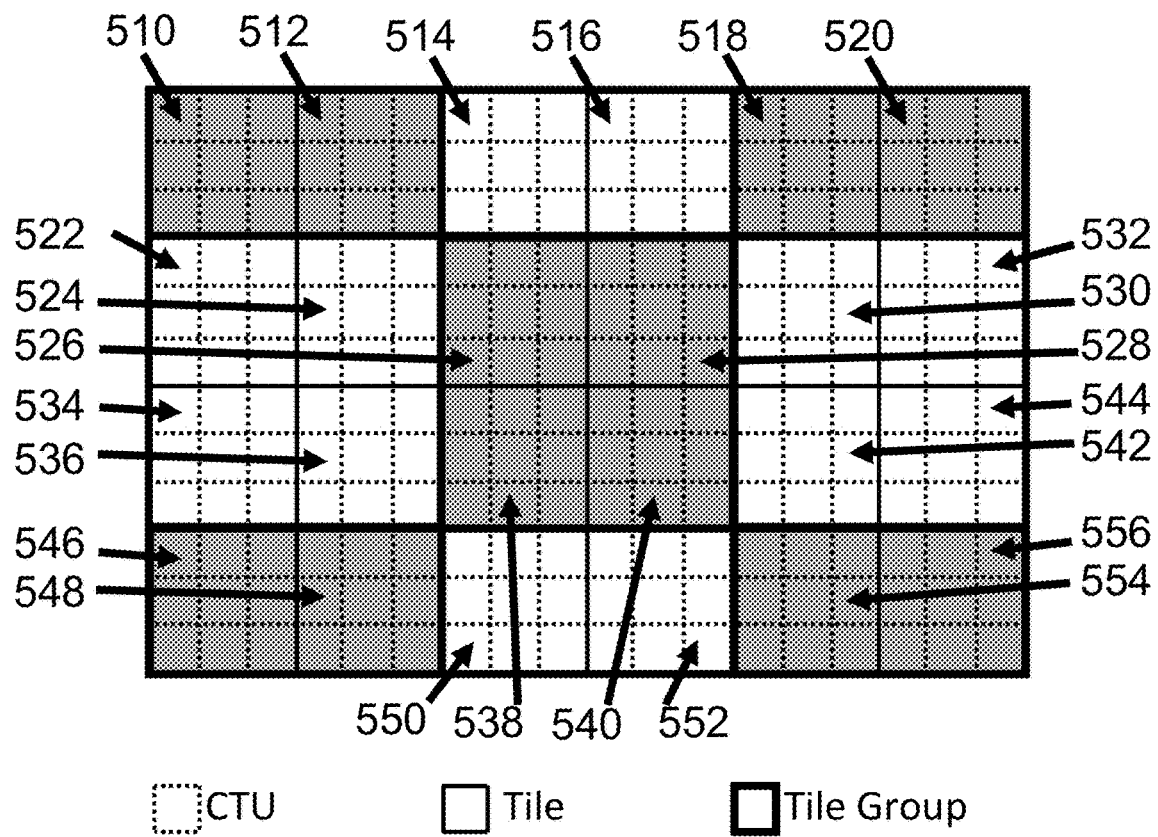
FIG. 5 is an illustration of a picture with 18 by 12 luma CTUs, according to an example of the present disclosure.
Figure 6A:
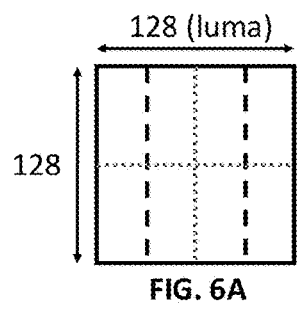
FIG. 6A is an illustration of an example of disallowed ternary tree (TT) and binary tree (BT) partitioning in VTM, according to an example of the present disclosure.
Figure 6B:
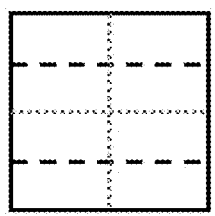
FIG. 6B is an illustration of an example of disallowed TT and BT partitioning in VTM, according to an example of the present disclosure.
Figure 6C:
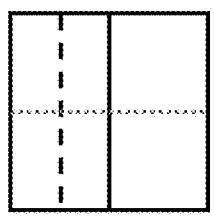
FIG. 6C is an illustration of an example of disallowed TT and BT partitioning in VTM, according to an example of the present disclosure.
Figure 6D:
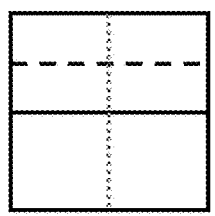
FIG. 6D is an illustration of an example of disallowed TT and BT partitioning in VTM, according to an example of the present disclosure.
Figure 6E:
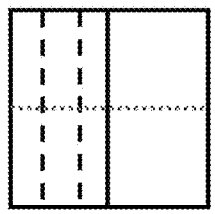
FIG. 6E is an illustration of an example of disallowed TT and BT partitioning in VTM, according to an example of the present disclosure.
Figure 6F:
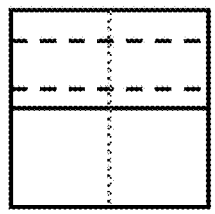
FIG. 6F is an illustration of an example of disallowed TT and BT partitioning in VTM, according to an example of the present disclosure.
Figure 6G:
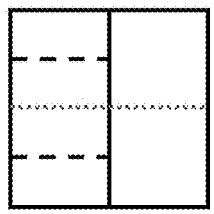
FIG. 6G is an illustration of an example of disallowed TT and BT partitioning in VTM, according to an example of the present disclosure.
Figure 6H:
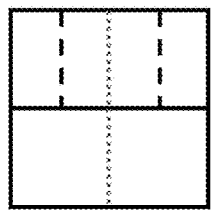
FIG. 6H is an illustration of an example of disallowed TT and BT partitioning in VTM, according to an example of the present disclosure.

FIG. 5 shows an example of rectangular tile group partitioning of a picture, where the picture is divided into 24 tiles (6 tile columns and 4 tile rows) and 9 rectangular tile groups. FIG. 5 includes tile 510, 512, 514, 516, 518, 520, 522, 524, 526, 528, 530, 532, 534, 536, 538, 540, 542, 544, 546, 548, 550, 552, 554, and 556. More specifically, FIG. 5 shows a picture with 18 by 12 luma CTUs that is partitioned into 24 tiles and 9 tile groups (informative). A tile group contains tiles and a tile contain CTUs. The 9 rectangular tile groups include (1) the two tiles 510 and 512, (2) the two 514 and 516, (3) the two tiles 518 and 520, (4) the four tiles 522, 524, 534, and 536, (5) the four tiles groups 526, 528, 538, and 540 (6) the four tiles 530, 532, 542, and 544, (7) the two tiles 546 and 548, (8) the two tiles 550 and 552, and (9) the two tiles 554 and 556.

Large Block-Size Transforms with High-Frequency Zeroing in VVC

In VTM4, large block-size transforms, up to 64×64 in size, are enabled, which is primarily useful for higher resolution video, e.g., 1080p and 4K sequences. High-frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values. Virtual Pipeline Data Units (VPDUs) in VVC Virtual pipeline data units (VPDUs) are defined as non-overlapping units in a picture. In hardware decoders, successive VPDUs are processed by multiple pipeline stages at the same time. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size.

In order to keep the VPDU size as 64×64 luma samples, the following normative partition restrictions (with syntax signaling modification) are applied in VTM5:

TT split is not allowed for a CU with either width or height, or both width and height equal to 128. For a 128xN CU with N≤64 (i.e., width equal to 128 and height smaller than 128), horizontal BT is not allowed. For an Nx128 CU with N≤64 (i.e., height equal to 128 and width smaller than 128), vertical BT is not allowed.

FIGS. 6A, 6B, 6C, 6D, 6E, 6F, 6G, and 6H show examples of disallowed TT and BT partitioning in VTM.

Transform Coefficient Coding in VVC

Transform coefficient coding in VVC is similar to HEVC in the sense that they both use non-overlapped coefficient groups (also called CGs or subblocks). However, there are also some differences between them. In HEVC, each CG of coefficients has a fixed size of 4×4. In VVC Draft 6, the CG size becomes dependent on TB size. As a consequence, various CG sizes (1×16, 2×8, 8×2, 2×4, 4×2 and 16×1) are available in VVC. The CGs inside a coding block, and the transform coefficients within a CG, are coded according to pre-defined scan orders.

In order to restrict the maximum number of context coded bins per pixel, the area of the TB and the type of video component (e.g., luma component vs. chroma component) are used to derive the maximum number of context-coded bins (CCB) for a TB. The maximum number of context-coded bins is equal to Bozize*1.75. Here, TB_zosize indicates the number of samples within a TB after coefficient zero-out. Note that the coded_sub block_flag, which is a flag indicating if a CG contains non-zero coefficient or not, is not considered for CCB count.

Coefficient zero-out is an operation performed on a transform block to force coefficients located in a certain region of the transform block to be 0. For example, in the current VVC, a 64×64 transform has an associated zero-out operation. As a result, transform coefficients located outside the top-left 32×32 region inside a 64×64 transform block are all forced to be 0. In fact, in the current VVC, for any transform block with a size over 32 along a certain dimension, coefficient zero-out operation is performed along that dimension to force coefficients located beyond the top-left 32×32 region to be 0.

In transform coefficient coding in VVC, a variable, remBinsPass1, is first set to the maximum number of context-coded bins (MCCB) allowed. In the coding process, the variable is decreased by one each time when a context-coded bin is signaled. While the remBinsPass1 is larger than or equal to four, a coefficient is firstly signaled through syntaxes of sig_coeff_flag, abs_level_gt1_flag, par_level_flag, and abs_level_gt3_flag, all using context-coded bins in the first pass. The rest of level information of the coefficient is coded with syntax element of abs_remainder using Golomb-rice code and bypass-coded bins in the second pass. When the remBinsPass1 becomes smaller than 4 while coding the first pass, a current coefficient is not coded in the first pass, but directly coded in the second pass with the syntax element of dec_abs_level using Golomb-Rice code and bypass-coded bins. The rice parameter derivation process for dec_abs_level[ ] is derived as specified in Table 3.

Figure 7:
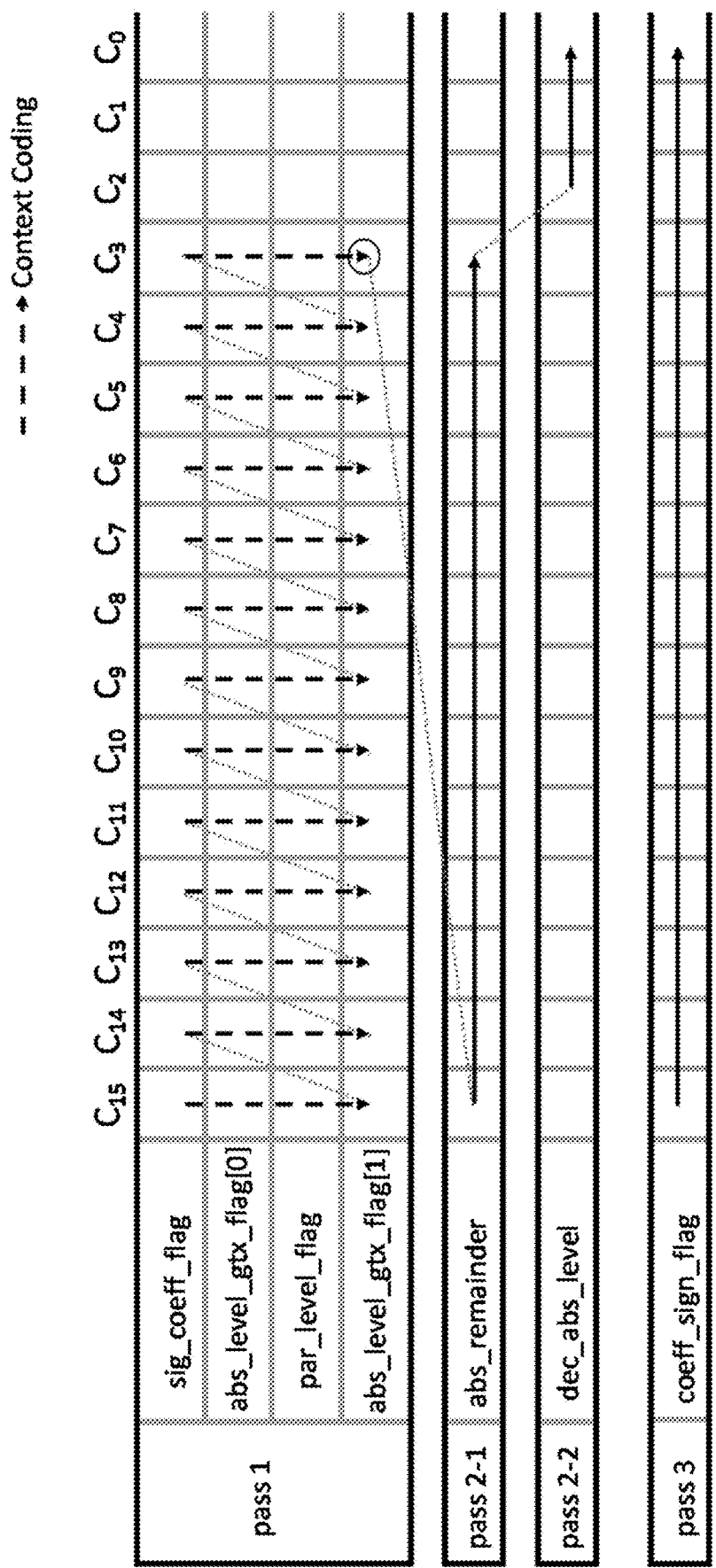
FIG. 7 is an illustration of a residual coding structure for transform blocks, according to an example of the present disclosure.

After all the above mentioned level coding, the signs (sign_flag) for all scan positions with sig_coeff_flag equal to 1 is finally coded as bypass bins. Such a process is depicted in FIG. 7 (described below). The remBinsPass1 is reset for every TB. The transition of using context-coded bins for the sig_coeff_flag, abs_level_gt1_flag (abs_level_gtx_flag [0]), par_level_flag, and abs_level_gt3_flag (abs_level_gtx_flag [1]) to using bypass-coded bins for the rest coefficients only happens at most once per TB. For a coefficient subblock, if the remBinsPass1 is smaller than 4 before coding its very first coefficient, the entire coefficient subblock is coded using bypass-coded bins.

FIG. 7 shows an illustration of residual coding structure for transform blocks.

The unified (same) rice parameter (RicePara) derivation is used for signaling the syntax of abs_remainder and dec_abs_level. The only difference is that the base level, baseLevel, is set to 4 and 0 for coding abs_remainder and dec_abs_level, respectively. Rice parameter is determined based on not only the sum of absolute levels of neighboring five transform coefficients in local template, but also the corresponding base level as follows:

RicePara=RiceParTable [max (min (31, sumAbs−5*baseLevel), 0)]

The syntax and the associated semantic of the residual coding in current VVC draft specification is illustrated in Table 1 and Table 2, respectively. How to read the Table 1 is illustrated in the appendix section of this disclosure which could also be found in the VVC specification.

TABLE 1

Syntax of residual coding

| | Descriptor |
|---|---|
| residual_coding( x0, y0, log2TbWidth, log2TbHeight, cIdx ) { | |
|   if( sps_mts_enabled_flag && cu_sbt_flag && cIdx = = 0 && | |
|     log2TbWidth = = 5 && log2TbHeight < 6 ) | |
|     log2ZoTbWidth = 4 | |
|   else | |
|     log2ZoTbWidth = Min( log2TbWidth, 5 ) | |
|   if( sps_mts_enabled_flag && cu_sbt_flag && cIdx = = 0 && | |
|     log2TbWidth < 6 && log2TbHeight = = 5 ) | |
|     log2ZoTbHeight = 4 | |
|   else | |
|     log2ZoTbHeight = Min( log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2TbWidth = log2ZoTbWidth | |
|   log2TbHeight = log2ZoTbHeight | |
|   remBinsPass1 = ( ( 1 << ( log2TbWidth + log2TbHeight ) ) * 7 ) >> 2 | |
|   log2SbW = ( Min( log2TbWidth, log2TbHeight ) < 2 ? 1 : 2 ) | |
|   log2SbH = log2SbW | |
|   if( log2TbWidth + log2TbHeight > 3 ) | |
|     if( log2TbWidth < 2 ) { | |
|       log2SbW = log2TbWidth | |
|       log2SbH = 4 − log2SbW | |
|     } else if( log2TbHeight < 2 ) { | |
|       log2SbH = log2TbHeight | |
|       log2SbW = 4 − log2SbH | |
|     } | |
|   numSbCoeff= 1 << ( log2SbW + log2SbH ) | |
|   lastScanPos = numSbCoeff | |
|   lastSubBlock = ( | |
| 1 << ( log2TbWidth + log2TbHeight − ( log2SbW + log2SbH ) ) ) − 1 | |
|   do { | |
|     if( lastScanPos = = 0 ) { | |
|       lastScanPos = numSbCoeff | |

TABLE 1-continued

Syntax of residual coding

| | Descriptor |
|---|---|
|         lastSubBlock- -<br>      }<br>      lastScanPos- -<br>      xS =<br>DiagScanOrder[ log2TbWidth - log2SbW ][ log2TbHeight - log2SbH ]<br>        [ lastSubBlock ][ 0 ]<br>      yS =<br>DiagScanOrder[ log2TbWidth - log2SbW ][ log2TbHeight - log2SbH ]<br>        [ lastSubBlock ][ 1 ]<br>      xC = ( xS << log2SbW ) +<br>DiagScanOrder[ log2SbW ][ log2SbH ][ lastScanPos ][ 0 ]<br>      yC = ( yS << log2SbH ) +<br>DiagScanOrder[ log2SbW ][ log2SbH ][ lastScanPos ][ 1 ]<br>    } while( ( xC != LastSignificantCoeffX) \|\| ( yC !=<br>LastSignificantCoeffY ) )<br>    if( lastSubBlock = = 0 && log2TbWidth >= 2 && log2TbHeight >= 2<br>&&<br>      !transform_skip_flag[ x0 ][ y0 ][ cIdx ] && lastScanPos > 0 )<br>      LfnstDcOnly = 0<br>    if( ( lastSubBlock > 0 && log2TbWidth >= 2 && log2TbHeight >= 2 )<br>\|\|<br>      ( lastScanPos > 7 && ( log2TbWidth = = 2 \|\| log2TbWidth = = 3 )<br>&&<br>      log2TbWidth = = log2TbHeight ) )<br>      LfnstZeroOutSigCoeffFlag = 0<br>    if( ( lastSubBlock > 0 ) lastScanPos > 0 ) && cIdx = = 0 )<br>      MtsDcOnly = 0<br>    QState = 0<br>    for( i = lastSubBlock; i >= 0; i- - ) {<br>      startQStateSb = QState<br>      xS =<br>DiagScanOrder[ log2TbWidth - log2SbW ][ log2TbHeight - log2SbH ]<br>        [ i ][ 0 ]<br>      yS =<br>DiagScanOrder[ log2TbWidth - log2SbW ][ log2TbHeight - log2SbH ]<br>        [ i ][ 1 ]<br>      inferSbDcSigCoeffFlag = 0<br>      if( i < lastSubBlock && i > 0 ) {<br>        sb_coded_flag[ xS ][ yS ] | ae(v) |
|         inferSbDcSigCoeffFlag = 1<br>      }<br>      if( sb_coded_flag[ xS ][ yS ] && ( xS > 3 \|\| yS > 3 ) && cIdx = = 0 )<br>        MtsZeroOutSigCoeffFlag = 0<br>      firstSigScanPosSb = numSbCoeff<br>      lastSigScanPosSb = -1<br>      firstPosMode0 = ( i = = lastSubBlock ? lastScanPos : numSbCoeff - 1 )<br>      firstPosMode1 = firstPosMode0<br>      for( n = firstPosMode0; n >= 0 && remBinsPass1 >= 4; n- - ) {<br>        xC = ( xS << log2SbW ) +<br>DiagScanOrder[ log2SbW ][ log2SbH ][ n ][ 0 ]<br>        yC = ( yS << log2SbH ) +<br>DiagScanOrder[ log2SbW ][ log2SbH ][ n ][ 1 ]<br>        if( sb_coded_flag[ xS ][ yS ] && ( n > 0 \|\| !inferSbDcSigCoeffFlag )<br>&&<br>        ( xC != LastSignificantCoeffX \|\| yC != LastSignificantCoeffY<br>) ) {<br>        sig_coeff_flag[ xC ][ yC ] | ae(v) |
|         remBinsPass1- -<br>        if( sig_coeff_flag[ xC ][ yC ] )<br>          inferSbDcSigCoeffFlag = 0<br>        }<br>        if( sig_coeff_flag[ xC ][ yC ] ) {<br>          abs_level_gtx_flag[ n ][ 0 ] | ae(v) |
|           remBinsPass1- -<br>          if( abs_level_gtx_flag[ n ][ 0 ] ) {<br>            par_level_flag[ n ] | ae(v) |
|             remBinsPass1- -<br>            abs_level_gtx_flag[ n ][ 1 ] | ae(v) |
|             remBinsPass1- -<br>          }<br>          if( lastSigScanPosSb = = -1 )<br>            lastSigScanPosSb = n<br>          firstSigScanPosSb = n<br>        }<br>        AbsLevelPass1[ xC ][ yC ] = sig_coeff_flag[ xC ][ yC ] +<br>par_level_flag[ n ] + | |

TABLE 1-continued

Syntax of residual coding

| | Descriptor |
|---|---|
| ``abs_level_gtx_flag[ n ][ 0 ] + 2 * abs_level_gtx_flag[ n ][ 1 ]``<br>    if( sh_dep_quant_used_flag )<br>      QState = QStateTransTable[ QState ][ AbsLevelPass1[ xC ][ yC ] & 1 ]<br>    firstPosModel = n − 1<br>  }<br>  for( n = firstPosMode0; n > firstPosModel; n− − ) {<br>    xC = ( xS << log2SbW ) + DiagScanOrder[ log2SbW ][ log2SbH ][ n ][ 0 ]<br>    yC = ( yS << log2SbH ) + DiagScanOrder[ log2SbW ][ log2SbH ][ n ][ 1 ]<br>    if( abs_level_gtx_flag[ n ][ 1 ] )<br>      abs_remainder[ n ] | ae(v) |
|     AbsLevel[ xC ][ yC ] = AbsLevelPass1[ xC ][ yC ] +2 * abs_remainder[ n ]<br>  }<br>  for( n = firstPosMode1; n >= 0; n− − ) {<br>    xC = ( xS << log2SbW ) + DiagScanOrder[ log2SbW ][ log2SbH ][ n ][ 0 ]<br>    yC = ( yS << log2SbH ) + DiagScanOrder[ log2SbW ][ log2SbH ][ n ][ 1 ]<br>    if( sb_coded_flag[ xS ][ yS ] )<br>      dec_abs_level[ n ] | ae(v) |
|     if( AbsLevel[ xC ][ yC ] > 0 ) {<br>      if( lastSigScanPosSb = = −1 )<br>        lastSigScanPosSb = n<br>      firstSigScanPosSb = n<br>    }<br>    if( sh_dep_quant_used_flag )<br>      QState = QStateTransTable[ QState ][ AbsLevel[ xC ][ yC ] & 1 ]<br>  }<br>  signHiddenFlag = sh_sign_data_hiding_used_flag &&<br>    ( lastSigScanPosSb − firstSigScanPosSb > 3 ? 1 : 0 )<br>  for( n = numSbCoeff − 1; n >= 0; n− − ) {<br>    xC = ( xS << log2SbW ) + DiagScanOrder[ log2SbW ][ log2SbH ][ n ][ 0 ]<br>    yC = ( yS << log2SbH ) + DiagScanOrder[ log2SbW ][ log2SbH ][ n ][ 1 ]<br>    if( ( AbsLevel[ xC ][ yC ] > 0 ) &&<br>      ( !signHiddenFlag \|\| ( n != firstSigScanPosSb ) ) )<br>      coeff_sign_flag[ n ] | ae(v) |
|   }<br>  if( sh_dep_quant_used_flag ) {<br>    QState = startQStateSb<br>    for( n = numSbCoeff − 1; n >= 0; n− − ) {<br>      xC = ( xS << log2SbW ) + DiagScanOrder[ log2SbW ][ log2SbH ][ n ][ 0 ]<br>      yC = ( yS << log2SbH ) + DiagScanOrder[ log2SbW ][ log2SbH ][ n ][ 1 ]<br>      if( AbsLevel[ xC ][ yC ] > 0 )<br>        TransCoeffLevel[ x0 ][ y0 ][ cIdx ][ xC ][ yC ] =<br>          ( 2 * AbsLevel[ xC ][ yC ] − ( QState > 1 ? 1 : 0 ) ) *<br>          ( 1 − 2 * coeff_sign_flag[ n ] )<br>      QState = QStateTransTable[ QState ][ AbsLevel[ xC ][ yC ] & 1 ]<br>  } else {<br>    sumAbsLevel = 0<br>    for( n = numSbCoeff − 1; n >= 0; n− − ) {<br>      xC = ( xS << log2SbW ) + DiagScanOrder[ log2SbW ][ log2SbH ][ n ][ 0 ]<br>      yC = ( yS << log2SbH ) + DiagScanOrder[ log2SbW ][ log2SbH ][ n ][ 1 ]<br>      if( AbsLevel[ xC ][ yC ] > 0 ) {<br>        TransCoeffLevel[ x0 ][ y0 ][ cIdx ][ xC ][ yC ] =<br>          AbsLevel[ xC ][ yC ] * ( 1 − 2 * coeff_sign_flag[ n ] ) | |

TABLE 1-continued

Syntax of residual coding

|  | Descriptor |
|---|---|

```
              if( signHiddenFlag ) {
                sumAbsLevel += AbsLevel[ xC ][ yC ]
                if( ( n == firstSigScanPosSb ) && ( sumAbsLevel % 2 ) = =
1 ) )
                  TransCoeffLevel[ x0 ][ y0 ][ cIdx ][ xC ][ yC ] =
                    −TransCoeffLevel[ x0 ][ y0 ][ cIdx ][ xC ][ yC ]
              }
            }
          }
        }
      }
    }
}
```

TABLE 2

Semantic of residual coding

The array AbsLevel[ xC ][ yC ] represents an array of absolute values of transform coefficient levels for the current transform block and the array AbsLevelPass1[ xC ][ yC ] represents an array of partially reconstructed absolute values of transform coefficient levels for the current transform block. The array indices xC and yC specify the transform coefficient location ( xC, yC ) within the current transform block. When the value of AbsLevel[ xC ][ yC ] is not specified in subclause 7.3.11.11, it is inferred to be equal to 0. When the value of AbsLevelPass1[ xC ][ yC ] is not specified in subclause 7.3.11.11, it is inferred to be equal to 0.
The variables CoeffMin and CoeffMax specifying the minimum and maximum transform coefficient values are derived as follows:

$\quad$ CoeffMin = −( 1 << 15 ) $\hfill$ (189)
$\quad$ CoeffMax = ( 1 << 15 ) − 1 $\hfill$ (190)

The array QStateTransTable[ ][ ] is specified as follows:

$\quad$ QStateTransTable[ ][ ] = { { 0, 2 }, { 2, 0 }, { 1, 3 }, { 3, 1 } } $\hfill$ (191)

last_sig_coeff_x_prefix specifies the prefix of the column position of the last significant coefficient in scanning order within a transform block. The values of last_sig_coeff_x_prefix shall be in the range of 0 to ( log2ZoTbWidth << 1 ) − 1, inclusive.
When last_sig_coeff_x_prefix is not present, it is inferred to be 0.
last_sig_coeff_y_prefix specifies the prefix of the row position of the last significant coefficient in scanning order within a transform block. The values of last_sig_coeff_y_prefix shall be in the range of 0 to ( log2ZoTbHeight << 1 ) − 1, inclusive.
When last_sig_coeff_y_prefix is not present, it is inferred to be 0.
last_sig_coeff_x_suffix specifies the suffix of the column position of the last significant coefficient in scanning order within a transform block. The values of last_sig_coeff_x_suffix shall be in the range of 0 to ( 1 << ( ( last_sig_coeff_x_prefix >> 1 ) − 1 ) ) − 1, inclusive.
The column position of the last significant coefficient in scanning order within a transform block LastSignificantCoeffX is derived as follows:
- If last_sig_coeff_x_suffix is not present, the following applies:
$\quad$ LastSignificantCoeffX $\quad$ = $\quad$ last_sig_coeff_x_prefix
$\hfill$ (192)
- Otherwise (last_sig_coeff_x_suffix is present), the following applies:
$\quad$ LastSignificantCoeffX = ( 1 << ( ( last_sig_coeff_x_prefix >> 1 ) − 1 ) ) * $\hfill$ (193)
$\quad\quad$ ( 2 + (last_sig_coeff_x_prefix & 1 ) ) + last_sig_coeff_x_suffix last_sig_coeff_y_suffix specifies the suffix of the row position of the last significant coefficient in scanning order within a transform block. The values of last_sig_coeff_y_suffix shall be in the range of 0 to ( 1 << ( ( last_sig_coeff_y_prefix >> 1 ) − 1 ) ) − 1, inclusive.
The row position of the last significant coefficient in scanning order within a transform block LastSignificantCoeffY is derived as follows:
- If last_sig_coeff_y_suffix is not present, the following applies:
$\quad$ LastSignificantCoeffY $\quad$ = $\quad$ last_sig_coeff_y_prefix
$\hfill$ (194)
- Otherwise (last_sig_coeff_y_suffix is present), the following applies:
$\quad$ LastSignificantCoeffY = ( 1 << ( ( last_sig_coeff_y_prefix >> 1 ) − 1 ) ) * $\hfill$ (195)
$\quad\quad$ ( 2 + ( last_sig_coeff_y_prefix & 1 ) ) + last_sig_coeff_y_suffix sb_coded_flag[ xS ][ yS ] specifies the following for the subblock at location ( xS, yS ) within the current transform block, where a subblock is an array of transform coefficient levels:
When sb_coded_flag[ xS ][ yS ] is equal to 0, all transform coefficient levels of the subblock at location ( xS, yS ) are inferred to be equal to 0.
When sb_coded_flag[ xS ][ yS ] is not present, it is inferred to be equal to 1.
sig_coeff_flag[ xC ][ yC ] specifies for the transform coefficient location ( xC, yC ) within the current transform block whether the corresponding transform coefficient level at the location ( xC, yC ) is non-zero as follows:
- If sig_coeff_flag[ xC ][ yC ] is equal to 0, the transform coefficient level at the location ( xC, yC ) is set equal to 0.

TABLE 2-continued

Semantic of residual coding

- Otherwise (sig_coeff_flag[ xC ][ yC ] is equal to 1), the transform coefficient level at the
  location ( xC, yC ) has a non-zero value.
When sig_coeff_flag[ xC ][ yC ] is not present, it is inferred as follows:
- If     transform_skip_flag[ x0 ][ y0 ][ cIdx ]   is   equal   to   0   or
  sh_ts_residual_coding_disabled_flag is equal to 1, the following applies:
    - If     ( xC, yC )     is     the     last     significant     location
      ( LastSignificantCoeffX, LastSignificantCoeffY )   in   scan order or all of the
      following conditions are true, sig_coeff_flag[ xC ][ yC ] is inferred to be equal to 1:
        - ( xC & ( (1 << log2SbW ) − 1 ), yC & ( (1 << log2SbH ) − 1 ) ) is equal to
          ( 0, 0 ).
        - inferSbDcSigCoeffFlag is equal to 1.
        - sb_coded_flag[ xS ][ yS ] is equal to 1.
    - Otherwise, sig_coeff_flag[ xC ][ yC ] is inferred to be equal to 0.
- Otherwise (transform_skip_flag[ x0 ][ y0 ][ cIdx ]     is     equal     to     1     and
  sh_ts_residual_coding_disabled_flag is equal to 0), the following applies:
    - If all of the following conditions are true, sig_coeff_flag[ xC ][ yC ] is inferred to
      be equal to 1:
        - ( xC & ( (1 << log2SbW ) − 1 ), yC & ( (1 << log2SbH ) − 1 ) ) is equal to
          ( (1 << log2SbW ) − 1, (1 << log2SbH ) − 1 ).
        - inferSbSigCoeffFlag is equal to 1.
        - sb_coded_flag[ xS ][ yS ] is equal to 1.
    - Otherwise, sig_coeff_flag[ xC ][ yC ] is inferred to be equal to 0.
abs_level_gtx_flag[ n ][ j ] specifies whether the absolute value of the transform coefficient
level    (at    scanning    position n)    is    greater    than ( j << 1 ) + 1.    When
abs_level_gtx_flag[ n ][ j ] is not present, it is inferred to be equal to 0.
par_level_flag[ n ] specifies the parity of the transform coefficient level at scanning
position n. When par_level_flag[ n ] is not present, it is inferred to be equal to 0.
abs_remainder[ n ] is the remaining absolute value of a transform coefficient level that is
coded with Golomb-Rice code at the scanning position n. When abs_remainder[ n ] is not
present, it is inferred to be equal to 0.
It is a requirement of bitstream conformance that the value of abs_remainder[ n ] shall be
constrained     such     that     the     corresponding     value     of
TransCoeffLevel[ x0 ][ y0 ][ cIdx ][ xC ][ yC ] is in the range of CoeffMin to CoeffMax,
inclusive.
dec_abs_level[ n ] is an intermediate value that is coded with Golomb-Rice code at the
scanning position n. Given ZeroPos[ n ] that is derived in Table 3 during the parsing of
dec_abs_level[ n ], the absolute value of a transform coefficient level at location ( xC, yC )
AbsLevel[ xC ][ yC ] is derived as follows:
- If dec_abs_level[ n ] is not present or equal to ZeroPos[ n ], AbsLevel[ xC ][ yC ] is set
  equal to 0.
- Otherwise, if dec_abs_level[ n ] is less than ZeroPos[ n ], AbsLevel[ xC ][ yC ] is set
  equal to dec_abs_level[ n ] + 1;
- Otherwise (dec_abs_level[ n ] is greater than ZeroPos[ n ]), AbsLevel[ xC ][ yC ] is set
  equal to dec_abs_level[ n ].
It is a requirement of bitstream conformance that the value of dec_abs_level[ n ] shall be
constrained     such     that     the     corresponding     value     of
TransCoeffLevel[ x0 ][ y0 ][ cIdx ][ xC ][ yC ] is in the range of CoeffMin to CoeffMax,
inclusive.
coeff_sign_flag[ n ] specifies the sign of a transform coefficient level for the scanning
position n as follows:
- If coeff_sign_flag[ n ] is equal to 0, the corresponding transform coefficient level has a
  positive value.
- Otherwise (coeff_sign_flag[ n ] is equal to 1), the corresponding transform coefficient
  level has a negative value.
When coeff_sign_flag[ n ] is not present, it is inferred to be equal to 0.
The value of CoeffSignLevel[ xC ][ yC ] specifies the sign of a transform coefficient level
at the location ( xC, yC ) as follows:
- If CoeffSignLevel[ xC ][ yC ] is equal to 0, the corresponding transform coefficient level
  is equal to zero
- Otherwise, if CoeffSignLevel[ xC ][ yC ] is equal to 1, the corresponding transform
  coefficient level has a positive value.
- Otherwise (CoeffSignLevel[ xC ][ yC ] is equal to −1), the corresponding transform
  coefficient level has a negative value.

TABLE 3

Rice parameter derivation process for abs_remainder[ ] and dec_abs_level[ ]

Inputs to this process are the base level baseLevel, the colour component index cIdx, the
luma location ( x0, y0 ) specifying the top-left sample of the current transform block
relative to the top-left sample of the current picture, the current coefficient scan location
( xC, yC ), the binary logarithm of the transform block width log2TbWidth, and the binary
logarithm of the transform block height log2TbHeight.
Output of this process is the Rice parameter cRiceParam.

TABLE 3-continued

Rice parameter derivation process for abs_remainder[ ] and dec_abs_level[ ]

Given the array AbsLevel[ x ][ y ] for the transform block with component index cIdx and the top-left luma location ( x0, y0 ), the variable locSumAbs is derived as specified by the following pseudo code:
```
locSumAbs = 0
if( xC < (1 << log2TbWidth) − 1 ) {
    locSumAbs += AbsLevel[ xC + 1 ][ yC ]
    if( xC < (1 << log2TbWidth) − 2 )
        locSumAbs += AbsLevel[ xC + 2 ][ yC ]
    if( yC < (1 << log2TbHeight) − 1 )
        locSumAbs += AbsLevel[ xC + 1 ][ yC + 1 ]                              (1494)
}
if( yC < (1 << log2TbHeight) − 1 ) {
    locSumAbs += AbsLevel[ xC ][ yC + 1 ]
    if( yC < (1 << log2TbHeight) − 2 )
        locSumAbs += AbsLevel[ xC ][ yC + 2 ]
}
locSumAbs = Clip3( 0, 31, locSumAbs − baseLevel * 5 )
```
Given the variable locSumAbs, the Rice parameter cRiceParam is derived as specified in Table 4 below.
When baseLevel is equal to 0, the variable ZeroPos[ n ] is derived as follows:
ZeroPos[ n ] = ( QState < 2 ? 1 : 2 ) << cRiceParam

TABLE 4

Specification of cRiceParam based on locSumAbs

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

Residual Coding for Transform Skip Mode in VVC

Unlike HEVC where a single residual coding scheme is designed for coding both transform coefficients and transform skip coefficients, in VVC two separate residual coding schemes are employed for transform coefficients and transform skip coefficients (i.e., residual), respectively.

In transform skip mode, the statistical characteristics of residual signal are different from those of transform coefficients, and no energy compaction around low-frequency components is observed. The residual coding is modified to account for the different signal characteristics of the (spatial) transform skip residual which includes:
- no signalling of the last x/y position;
- coded_sub_block_flag coded for every subblock except for the DC subblock when all previous flags are equal to 0;
- sig_coeff_flag context modelling with two neighboring coefficients;
- par_level_flag using only one context model;
- additional greater than 5, 7, 9 flags;
- modified rice parameter derivation for the remainder binarization; and
- context modeling for the sign_flag is determined based on left and above neighboring coefficient values and sign_flag is parsed after sig_coeff_flag to keep all context coded bins together.

Figure 8:
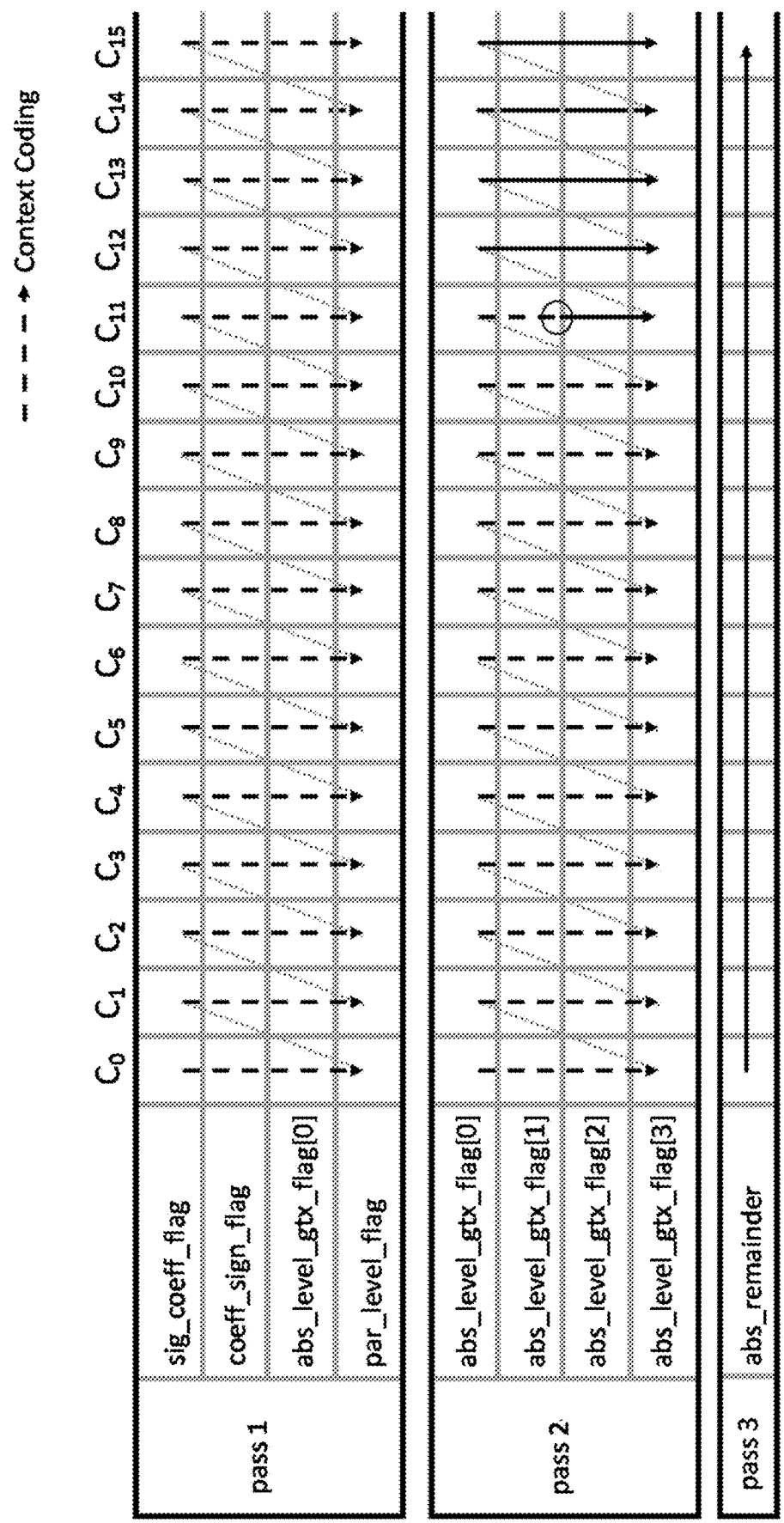
FIG. 8 is an illustration of a residual coding structure for transform skip blocks, according to an example of the present disclosure.

As shown in FIG. 8 (described below), syntax elements sig_coeff_flag, coeff_sign_flag, abs_level_gt1_flag (abs_level_gtx_flag [0]), par_level_flag, are coded in an interleaved manner residual sample by residual sample in the first pass, followed by abs_level_gtX_flag (abs_level_gtx_flag [0], abs_level_gtx_flag [1], abs_level_gtx_flag [2] fll abs_level_gtx_flag [3]) bitplanes in the second pass, and abs_remainder coding in the third pass.

Pass 1: sig_coeff_flag, coeff_sign_flag, abs_level_gt1_flag (abs_level_gtx_flag [0]), par_level_flag.

Pass 2: abs_level_gt3_flag (abs_level_gtx_flag [0]), abs_level_gt5_flag (abs_level_gtx_flag [1]), abs_level_gt7_flag (abs_level_gtx_flag [1]), abs_level_gt9_flag (abs_level_gtx_flag [3]).

Pass 3: abs_remainder.

FIG. 8 shows an illustration of residual coding structure for transform skip blocks.

The syntax and the associated semantic of the residual coding for transform skip mode in current VVC draft specification is illustrated in Table 5 and Table 2, respectively. How to read the Table 5 is illustrated in the appendix section of this disclosure which could also be found in the VVC specification.

TABLE 5

Syntax of residual coding for transform skip mode

Descriptor residual_ts_coding( x0, y0, log2TbWidth, log2TbHeight, cIdx ) {
    log2SbW = ( Min( log2TbWidth, log2TbHeight ) < 2 ? 1 : 2 )

TABLE 5-continued

Syntax of residual coding for transform skip mode

| | Descriptor |
|---|---|

```
        log2SbH = log2SbW
        if( log2TbWidth + log2TbHeight > 3 )
            if( log2TbWidth < 2 ) {
                log2SbW = log2TbWidth
                log2SbH = 4 − log2SbW
            } else if( log2TbHeight < 2 ) {
                log2SbH = log2TbHeight
                log2SbW = 4 − log2SbH
            }
        numSbCoeff = 1 << ( log2SbW + log2SbH )
        lastSubBlock = (
1 << ( log2TbWidth + log2TbHeight − ( log2SbW + log2SbH ) ) ) − 1
        inferSbCbf = 1
        RemCcbs = ( ( 1 << ( log2TbWidth + log2TbHeight ) ) *7 ) >> 2
        for( i =0; i <= lastSubBlock; i++ ) {
            xS =
DiagScanOrder[ log2TbWidth − log2SbW ][ log2TbHeight − log2SbH ][ i ][
0 ]
            yS =
DiagScanOrder[ log2TbWidth − log2SbW ][ log2TbHeight − log2SbH ][ i ][
1 ]
            if( i != lastSubBlock || !inferSbCbf )
                sb_coded_flag[ xS ][ yS ]                          ae(v)
            if( sb_coded_flag[ xS ][ yS ] && i < lastSubBlock )
                inferSbCbf = 0
        /* First scan pass */
            inferSbSigCoeffFlag = 1
            lastScanPosPass1 = −1
            for( n = 0; n <= numSbCoeff − 1 && RemCcbs >= 4; n++ ) {
                xC = ( xS << log2SbW ) +
DiagScanOrder[ log2SbW ][ log2SbH ][ n ][ 0 ]
                yC = ( yS << log2SbH ) +
DiagScanOrder[ log2SbW ][ log2SbH ][ n ][ 1 ]
                lastScanPosPass1 = n
                if( sb_coded_flag[ xS ][ yS ] &&
                    ( n != numSbCoeff − 1 || !inferSbSigCoeffFlag ) ) {
                    sig_coeff_flag[ xC ][ yC ]                     ae(v)
                    RemCcbs− −
                    if( sig_coeff_flag[ xC ][ yC ] )
                        inferSbSigCoeffFlag = 0
                }
                CoeffSignLevel[ xC ][ yC ] = 0
                if( sig_coeff_flag[ xC ][ yC ] ) {
                    coeff_sign_flag[ n ]                           ae(v)
                    RemCcbs− −
                    CoeffSignLevel[ xC ][ yC ] = ( coeff_sign_flag[ n ] > 0 ? − 1 : 1 )
                    abs_level_gtx_flag[ n ][ 0 ]                   ae(v)
                    RemCcbs− −
                    if( abs_level_gtx_flag[ n ][ 0 ] ) {
                        par_level_flag[ n ]                        ae(v)
                        RemCcbs− −
                    }
                }
                AbsLevelPass1[ xC ][ yC ] =
                    sig_coeff_flag[ xC ][ yC ] + par_level_flag[ n ] +
abs_level_gtx_flag[ n ][ 0 ]
            }
        /* Greater than X scan pass (numGtXFlags=5) */
            lastScanPosPass2 = −1
            for( n = 0; n <= numSbCoeff − 1 && RemCcbs >= 4; n++ ) {
                xC = ( xS << log2SbW ) +
DiagScanOrder[ log2SbW ][ log2SbH ][ n ][ 0 ]
                yC = ( yS << log2SbH ) +
DiagScanOrder[ log2SbW ][ log2SbH ][ n ][ 1 ]
                AbsLevelPass2[ xC ][ yC ] = AbsLevelPass1[ xC ][ yC ]
                for( j = 1; j < 5; j++ ) {
                    if( abs_level_gtx_flag[ n ][ j − 1 ] ) {
                        abs_level_gtx_flag[ n ][ j ]               ae(v)
                        RemCcbs− −
                    }
                    AbsLevelPass2[ xC ][ yC ] += 2 * abs_level_gtx_flag[ n ][ j ]
                }
                lastScanPosPass2 = n
            }
        /* remainder scan pass */
            for( n = 0; n <= numSbCoeff − 1; n++ ) {
```

TABLE 5-continued

Syntax of residual coding for transform skip mode

| | Descriptor |
|---|---|
| ```
        xC = ( xS << log2SbW ) +
DiagScanOrder[ log2SbW ][ log2SbH ][ n ][ 0 ]
        yC = ( yS << log2SbH ) +
DiagScanOrder[ log2SbW ][ log2SbH ][ n ][ 1 ]
            if( ( n <= lastScanPosPass2 && AbsLevelPass2[ xC ][ yC ] >= 10 )
| |
                ( n > lastScanPosPass2 && n <= lastScanPosPass1 &&
                AbsLevelPass1[ xC ][ yC ] >= 2 ) | |
                ( n > lastScanPosPass1 && sb_coded_flag[ xS ][ yS ] ) )
                abs_remainder[ n ]
            if( n <= lastScanPosPass2 )
                AbsLevel[ xC ][ yC ] =
AbsLevelPass2[ xC ][ yC ] + 2 * abs_remainder[ n ]
            else if(n <= lastScanPosPass1 )
                AbsLevel[ xC ][ yC ] =
AbsLevelPass1[ xC ][ yC ] + 2 * abs_remainder[ n ]
            else { /* bypass */
                AbsLevel[ xC ][ yC ] = abs_remainder[ n ]
                if( abs_remainder[ n ] )
                    coeff_sign_flag[ n ]
            }
            if( BdpcmFlag[ x0 ][ y0 ][ cIdx ] = = 0 && n <= lastScanPosPass1
) {
                absLeftCoeff = xC > 0 ? AbsLevel[ xC - 1 ][ yC ] ) : 0
                absAboveCoeff = yC > 0 ? AbsLevel[ xC ][ yC - 1 ] ) : 0
                predCoeff = Max( absLeftCoeff, absAboveCoeff )
                if( AbsLevel[ xC ][ yC ] = = 1 && predCoeff > 0 )
                    AbsLevel[ xC ][ yC ] = predCoeff
                else if( AbsLevel[ xC ][ yC ] > 0 && AbsLevel[ xC ][ yC ] <=
predCoeff )
                    AbsLevel[ xC ][ yC ]- -
            }
            TransCoeffLevel[ x0 ][ y0 ][ cIdx ][ xC ][ yC ] = ( 1 - 2 *
coeff_sign_flag[ n ] ) *
                AbsLevel[ xC ][ yC ]
        }
    }
}
``` | ae(v)<br><br><br><br><br><br><br><br><br>ae(v) |

Quantization

In current VVC, Maximum QP value was extended from 51 to 63, and the signaling of initial QP was changed accordingly. The initial value of SliceQpY can be modified at the slice segment layer when a non-zero value of slice_qp_delta is coded. For transform skip block, minimum allowed Quantization Parameter (QP) is defined as 4 because quantization step size becomes 1 when QP is equal to 4.

In addition, the same HEVC scalar quantization is used with a new concept called dependent scalar quantization. Dependent scalar quantization refers to an approach in which the set of admissible reconstruction values for a transform coefficient depends on the values of the transform coefficient levels that precede the current transform coefficient level in reconstruction order. The main effect of this approach is that, in comparison to conventional independent scalar quantization as used in HEVC, the admissible reconstruction vectors are packed denser in the N-dimensional vector space (N represents the number of transform coefficients in a transform block). That means, for a given average number of admissible reconstruction vectors per N-dimensional unit volume, the average distortion between an input vector and the closest reconstruction vector is reduced. The approach of dependent scalar quantization is realized by: (a) defining two scalar quantizers with different reconstruction levels and (b) defining a process for switching between the two scalar quantizers.

Figure 9:
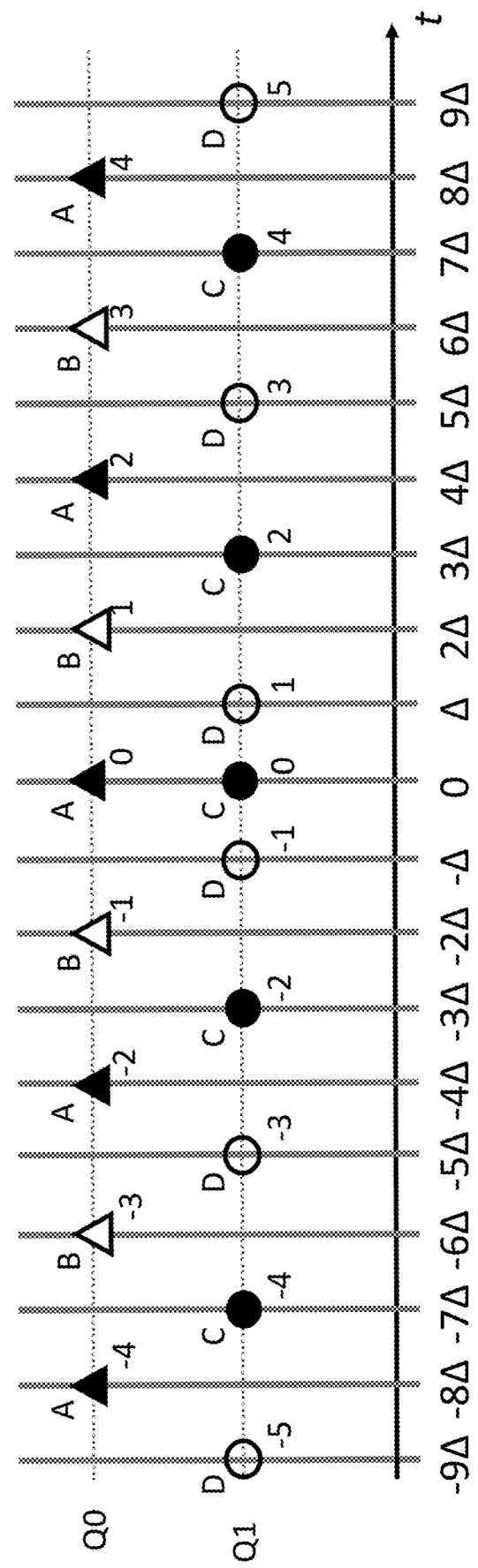
FIG. 9 is an illustration of two scalar quantizers, according to an example of the present disclosure.

The two scalar quantizers used, denoted by Q0 and Q1, are illustrated in FIG. 9 (described below). The location of the available reconstruction levels is uniquely specified by a quantization step size A. The scalar quantizer used (Q0 or Q1) is not explicitly signalled in the bitstream. Instead, the quantizer used for a current transform coefficient is determined by the parities of the transform coefficient levels that precede the current transform coefficient in coding/reconstruction order.

FIG. 9 shows an illustration of the two scalar quantizers used in the proposed approach of dependent quantization.

As illustrated in FIGS. 10A and 10B (described below), the switching between the two scalar quantizers (Q0 and Q1) is realized via a state machine with four quantizer states (QState). The QState can take four different values: 0, 1, 2, 3. It is uniquely determined by the parities of the transform coefficient levels preceding the current transform coefficient in coding/reconstruction order. At the start of the inverse quantization for a transform block, the state is set equal to 0. The transform coefficients are reconstructed in scanning order (i.e., in the same order they are entropy decoded). After a current transform coefficient is reconstructed, the state is updated as shown in FIG. 10, where k denotes the value of the transform coefficient level.

FIG. 10A shows a transition diagram illustrating a state transition for the proposed dependent quantization.

FIG. 10B shows a table illustrating a quantizer selection for the proposed dependent quantization.

It is also supported to signal the default and user-defined scaling matrices. The DEFAULT mode scaling matrices are all flat, with elements equal to 16 for all TB sizes. IBC and intra coding modes currently share the same scaling matrices. Thus, for the case of USER DEFINED matrices, the number of MatrixType and MatrixType_DC are updated as follows:

Matrix Type: 30=2 (2 for intra&IBC/inter)×3 (Y/Cb/Cr components)× 5 (square TB size: from 4×4 to 64×64 for luma, from 2×2 to 32×32 for chroma).

Matrix Type_DC: 14=2 (2 for intra&IBC/inter×1 for Y component)×3 (TB size: 16×16, 32×32, 64×64)+4 (2 for intra&IBC/inter×2 for Cb/Cr components)×2 (TB size: 16×16, 32×32).

The DC values are separately coded for following scaling matrices: 16×16, 32×32, and 64×64. For TBs of size smaller than 8×8, all elements in one scaling matrix are signalled. If the TBs have size greater than or equal to 8×8, only 64 elements in one 8×8 scaling matrix are signalled as a base scaling matrix. For obtaining square matrices of size greater than 8×8, the 8×8 base scaling matrix is up-sampled (by duplication of elements) to the corresponding square size (i.e., 16×16, 32×32, 64×64). When the zeroing-out of the high frequency coefficients for 64-point transform is applied, corresponding high frequencies of the scaling matrices are also zeroed out. That is, if the width or height of the TB is greater than or equal to 32, only left or top half of the coefficients is kept, and the remaining coefficients are assigned to zero. Moreover, the number of elements signalled for the 64×64 scaling matrix is also reduced from 8×8 to three 4×4 submatrices, since the bottom-right 4×4 elements are never used.

Context Modeling for Transform Coefficient Coding

The selection of probability models for the syntax elements related to absolute values of transform coefficient levels depends on the values of the absolute levels or partially reconstructed absolute levels in a local neighbourhood. The template used is illustrated in FIG. 11 (described below).

FIG. 11 shows an illustration of the template used for selecting probability models. The black square specifies the current scan position and the squares with an "x" represent the local neighbourhood used.

The selected probability models depend on the sum of the absolute levels (or partially reconstructed absolute levels) in a local neighbourhood and the number of absolute levels greater than 0 (given by the number of sig_coeff_flags equal to 1) in the local neighbourhood. The context modelling and binarization depends on the following measures for the local neighbourhood:

numSig: the number of non-zero levels in the local neighbourhood;

sumAbs1: the sum of partially reconstructed absolute levels (absLevel1) after the first pass in the local neighbourhood;

sumAbs: the sum of reconstructed absolute levels in the local neighbourhood; and diagonal position (d): the sum of the horizontal and vertical coordinates of a current scan position inside the transform block.

Based on the values of numSig, sumAbs1, and d, the probability models for coding sig_coeff_flag, abs_level_gt1_flag, par_level_flag, and abs_level_gt3_flag are selected. The Rice parameter for binarizing abs_remainder and dec_abs_level is selected based on the values of sumAbs and numSig.

In current VVC, reduced 32-point MTS (also called RMTS32) is based on skipping high frequency coefficients and used to reduce computational complexity of 32-point DST-7/DCT-8. And, it accompanies coefficient coding changes including all types of zero-out (i.e., RMTS32 and the existing zero out for high frequency components in DCT2). Specifically, binarization of last non-zero coefficient position coding is coded based on reduced TU size, and the context model selection for the last non-zero coefficient position coding is determined by the original TU size. In addition, 60 context models are used to code the sig_coeff_flag of transform coefficients. The selection of context model index is based on a sum of a maximum of five previously partially reconstructed absolute level called locSumAbsPass1 and the state of dependent quantization QState as follows:

If cIdx is equal to 0, ctxInc is derived as follows:
ctxInc=12*Max (0,QState−1)+
Min ((locSumAbsPass1+1)>>1, 3)+
(d<2?8: (d<5?4:0))

Otherwise (cIdx is greater than 0), ctxInc is derived as follows:
ctxInc=36+8*Max (0, QState−1)+
Min ((locSumAbsPass1+1)>>1,3)+ (d<2? 4:0)

Palette Mode

The basic idea behind a palette mode is that the samples in the CU are represented by a small set of representative color values. This set is referred to as the palette. It is also possible to indicate a color value that is excluded from the palette by signaling it as an escape color for which the values of three color components are directly signaled in bitstream. This is illustrated in FIG. 12.

Figures 12, 13:
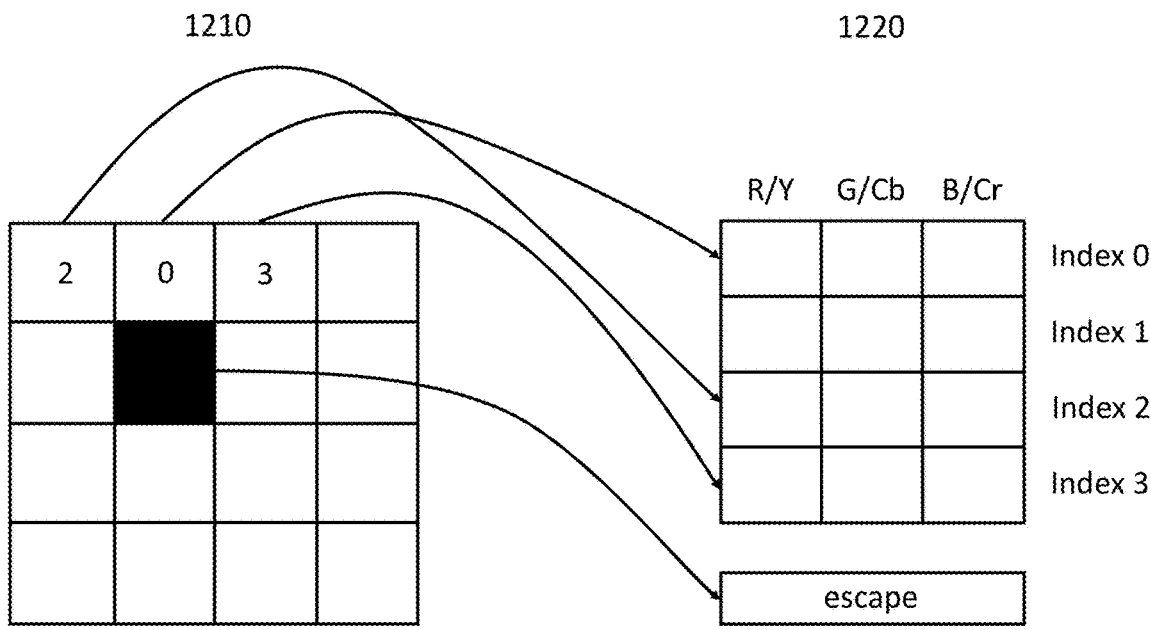
FIG. 12 is an illustration of an example of a block coded in palette mode, according to the present disclosure.
FIG. 13 is an illustration of a use of palette predictor to signal palette entries, according to the present disclosure.

FIG. 12 shows and example of a block coded in palette mode. FIG. 12 includes 1210 block coded in palette mode and 1220 palette.

In FIG. 12, the palette size is 4. The first 3 samples use palette entries 2, 0, and 3, respectively, for reconstruction. The black sample represents an escape symbol. A CU level flag, palette_escape_val_present_flag, indicates whether any escape symbols are present in the CU. If escape symbols are present, the palette size is augmented by one and the last index is used to indicate the escape symbol. Thus, in FIG. 12, index 4 is assigned to the escape symbol.

For decoding a palette-coded block, the decoder needs to have the following information: palette table; and palette indices.

If a palette index corresponds to the escape symbol, additional overhead is signaled to indicate the corresponding color values of the sample.

In addition, on the encoder side, it is necessary to derive the appropriate palette to be used with that CU.

For the derivation of the palette for lossy coding, a modified k-means clustering algorithm is used. The first sample of the block is added to the palette. Then, for each subsequent sample from the block, the sum of absolute difference (SAD) between the sample and each of the current palette color is calculated. If the distortion for each of the components is less than a threshold value for the palette entry corresponding to the minimum SAD, the sample is added to the cluster belonging to the palette entry. Otherwise, the sample is added as a new palette entry. When the number of samples mapped to a cluster exceeds a threshold, a centroid for that cluster is updated and becomes the palette entry of that cluster.

In the next step, the clusters are sorted in a descending order of usage. Then, the palette entry corresponding to each entry is updated. Normally, the cluster centroid is used as the palette entry. But a rate-distortion analysis is performed to analyze whether any entry from the palette predictor may be more suitable to be used as the updated palette entry instead of the centroid when the cost of coding the palette entries is taken into account. This process is continued till all the clusters are processed or the maximum palette size is reached. Finally, if a cluster has only a single sample and the corresponding palette entry is not in the palette predictor, the sample is converted to an escape symbol. Additionally, duplicate palette entries are removed and their clusters are merged.

After palette derivation, each sample in the block is assigned the index of the nearest (in SAD) palette entry. Then, the samples are assigned to 'INDEX' or 'COPY_ABOVE' mode. For each sample for which either 'INDEX' or 'COPY_ABOVE' mode is possible. Then, the cost of coding the mode is calculated. The mode for which the cost is lower is selected.

For coding of the palette entries, a palette predictor is maintained. The maximum size of the palette as well as the palette predictor is signaled in the SPS. The palette predictor is initialized at the beginning of each CTU row, each slice and each tile.

For each entry in the palette predictor, a reuse flag is signaled to indicate whether it is part of the current palette. This is illustrated in FIG. 13.

FIG. 13 shows use of palette predictor to signal palette entries. FIG. 13 includes previous palette 1310 and current palette 1320.

The reuse flags are sent using run-length coding of zeros. After this, the number of new palette entries are signaled using exponential Golomb code of order 0. Finally, the component values for the new palette entries are signaled.

The palette indices are coded using horizontal and vertical traverse scans as shown in FIGS. 14A and 14B. The scan order is explicitly signaled in the bitstream using the palette_transpose_flag.

FIG. 14A shows a horizontal traverse scan. FIG. 14B shows a vertical traverse scan.

For coding palette indices, a line coefficient group (CG) based palette mode is used, which divided a CU into multiple segments with 16 samples based on the traverse scan mode, as shown in FIGS. 15A and 15B, where index runs, palette index values, and quantized colors for escape mode are encoded/parsed sequentially for each CG.

FIG. 15A shows a sub-block-based index map scanning for palette. FIG. 15B shows a sub-block-based index map scanning for palette.

The palette indices are coded using two main palette sample modes: 'INDEX' and 'COPY_ABOVE'. As explained previously, the escape symbol is assigned an index equal to the maximum palette size. In the 'COPY_ABOVE' mode, the palette index of the sample in the row above is copied. In the 'INDEX' mode, the palette index is explicitly signaled. The encoding order for palette run coding in each segment is as follows:

For each pixel, 1 context coded bin run_copy_flag=0 is signalled indicating if the pixel is of the same mode as the previous pixel, i.e., if the previous scanned pixel and the current pixel are both of run type COPY_ABOVE or if the previous scanned pixel and the current pixel are both of run type INDEX and the same index value. Otherwise, run_copy_flag=1 is signaled.

If the pixel and the previous pixel are of different mode, one context coded bin copy_above_palette_indices_flag is signaled indicating the run type, i.e., INDEX or COPY_ABOVE, of the pixel. Decoder doesn't have to parse run type if the sample is in the first row (horizontal traverse scan) or in the first column (vertical traverse scan) since the INDEX mode is used by default. Also, decoder doesn't have to parse run type if the previously parsed run type is COPY_ABOVE.

After palette run coding of pixels in one segment, the index values for INDEX mode (palette_idx_idc) and quantized escape colors (palette_escape_val) are bypass coded.

Inefficiencies with Video Decoding

In VVC, when coding the transform coefficients, a unified (same) rice parameter (RicePara) derivation is used for signaling the syntax of abs_remainder and dec_abs_level. The only difference is that the base level, baseLevel, is set to 4 and 0 for coding abs_remainder and dec_abs_level, respectively. Rice parameter is determined based on not only the sum of absolute levels of neighboring five transform coefficients in local template, but also the corresponding base level, as follows:

RicePara=RiceParTable [max (min (31, sumAbs−5*baseLevel), 0)]

In other words, the binary codewords for the syntax elements abs_remainder and dec_abs_level are determined adaptively according to the level information of neighboring coefficients. Since this codeword determination is performed for each sample, it requires additional logics to handle this codeword adaptation for coefficients coding.

Similarly, when coding the residual block under transform skip mode, the binary codewords for the syntax elements abs_remainder are determined adaptively according to the level information of neighboring residual samples.

Moreover, when coding the syntax elements related to the residual coding or transform coefficients coding, the selection of probability models depends on the level information of the neighbouring levels, which requires additional logics and additional context models.

In current design, the binarization of escape samples is derived by invoking the third order Exp-Golomb binarization process. There is room to further improve its performance.

In current VVC, two different level mapping schemes are available and applied to regular transform and transform skip respectively. Each level mapping scheme is associated with different conditions, mapping function and mapping position. For blocks where the regular transform is applied, a level mapping scheme is used after the number of context-coded bins (CCB) exceeds limit. The mapping position, denoted as ZeroPos [n], and the mapping result, denoted as AbsLevel [xC] [yC], are derived as specified in Table 2. For blocks where transform skip is applied, another level mapping scheme is used before the number of context-coded bins (CCB) exceeds limit. The mapping position, denoted as predCoeff, and the mapping result, denoted as AbsLevel [xC] [yC], are derived as specified in Table 5. Such non-unified design may not be optimal from standardization point of view.

For profiles beyond 10-bits in HEVC, extended precision_processing_flag equal to 1 specifies that an extended dynamic range is used for coefficient parsing and inverse transform processing. In current VVC, the residual coding for transform coefficients or transform skip coding above 10-bit is reported as the cause of a significant reduction in performance. There is room to further improve its performance.

Proposed Methods

In this disclosure, several methods are proposed to address the issues mentioned in the section of inefficient with video decoding. It is noted that the following methods could be applied independently or jointly.

According to the first aspect of the disclosure, it is proposed to use a fixed set of binary codewords for coding certain syntax elements, e.g., abs_remainder, in residual coding. The binary codewords can be formed using different methods. Some exemplar methods are listed as follows.

First, the same procedure for determining the codeword for abs_remainder as used in the current VVC is used, but always with a fixed rice parameter (e.g., 1, 2 or 3) selected.

Second, fixed length binarization.

Third, truncated Rice binarization.

Fourth, truncated Binary (TB) binarization process.

Fifth, k-th order Exp-Golomb binarization process (EGk).

Sixth, Limited k-th order Exp-Golomb binarization.

According to the second aspect of the disclosure, it is proposed to use a fixed set of codewords for coding certain syntax elements, e.g., abs_remainder and dec_abs_level, in transform coefficient coding. The binary codewords can be formed using different methods. Some exemplar methods are listed as follows.

First, the same procedure for determining the codewords for abs_remainder and dec_abs level as used in the current VVC is used, but with a fixed rice parameter, e.g., 1, 2 or 3. The value of baseLevel can still be different for abs_remainder and dec_abs_level as used in current VVC. (e.g., baseLevel is set to 4 and 0 for coding abs_remainder and dec_abs_level, respectively).

Second, the same procedure for determining the codewords for abs_remainder and dec_abs level as used in the current VVC is used, but with a fixed rice parameter, e.g., 1, 2 or 3. The value of baseLevels for abs_remainder and dec_abs_level is chosen to be the same. e.g., both use 0 or both use 4.

Third, fixed length binarization.

Fourth, truncated Rice binarization.

Fifth, truncated Binary (TB) binarization process.

Sixth, k-th order Exp-Golomb binarization process (EGk).

Seventh, limited k-th order Exp-Golomb binarization.

According to the third aspect of the disclosure, it is proposed to use single context for the coding of the syntax elements related to the residual coding or coefficient coding (e.g., abs_level_gtx_flag) and the context selection based on the neighboring decoded level information can be removed.

According to the fourth aspect of the disclosure, it is proposed to use variable sets of binary codewords for coding certain syntax elements, e.g. abs_remainder, in residual coding, and the selection of the set of binary codewords is determined according to certain coded information of the current block, e.g. quantization parameter (QP) associated with the TB/CB and/or the slice, the prediction modes of the CU (e.g. IBC mode or intra or inter) and/or the slice type (e.g. I slice, P slice or B slice). Different methods may be used to derive the variable sets of binary codewords, with some exemplar methods listed as follows.

First, the same procedure for determining the codeword for abs_remainder as used in the current VVC is used, but with different rice parameters.

Second, k-th order Exp-Golomb binarization process (EGk).

Third, limited k-th order Exp-Golomb binarization.

TABLE 6

Rice parameter determination based on QP value if(QP$_{CU}$<TH1)
{
    rice parameter = K0
}
else if(QP$_{CU}$<TH2)
{
    rice parameter = K1
}
else if(QP$_{CU}$<TH3)
{
    rice parameter = K2
}
else if(QP$_{CU}$<TH4)
{
    rice parameter = K3
}
else
{
    rice parameter = K4
}

The same methods explained in the fourth aspect are also applicable to the transform efficient coding. According to the fifth aspect of the disclosure, it is proposed to use variable sets of binary codewords for coding certain syntax elements, e.g. abs_remainder and dec_abs_level, in transform coefficient coding, and the selection of the set of binary codewords is determined according to certain coded information of the current block, e.g. quantization parameter (QP) associated with the TB/CB and/or the slice, the prediction modes of the CU (e.g. IBC mode or intra or inter) and/or the slice type (e.g. I slice, P slice or B slice). Again, different methods may be used to derive the variable sets of binary codewords, with some exemplar methods listed as follows.

First, the same procedure for determining the codeword for abs_remainder as used in the current VVC is used, but with different rice parameters.

Second, k-th order Exp-Golomb binarization process (EGk).

Third, limited k-th order Exp-Golomb binarization.

In these methods above, different rice parameters may be used to derive different set of binary codewords. For a given block of residual samples, the rice parameters used are determined according to the CU QP, denoted as QP$_{CU}$, instead of the neighboring level information. One specific example is illustrated as shown in Table 6, where TH1 to TH4 are predefined thresholds satisfying (TH1<TH2<TH3<TH4), and K0 to K4 are predefined rice parameters. It is worth noting that the same logics can be implemented differently in practice. For example, certain equations, or a look-up table, may also be used to derive the same rice parameters, as shown in Table 6, from a QP value of a current CU.

According to the fifth aspect of the disclosure, a set of the parameters and/or thresholds associated with the codewords determination for the syntax elements of transform coefficients coding and/or transform skip residual coding are signaled into the bitstream. The determined codewords are used as binarization codewords when coding the syntax elements through an entropy coder, e.g., arithmetic coding.

It is noted that the set of parameters and/or thresholds can be a full set, or a subset of all the parameters and thresholds associated with the codewords determination for the syntax elements. The set of the parameters and/or thresholds can be signaled at different levels in the video bitstream. For example, they can be signaled at sequence level (e.g., the sequence parameter set), picture level (e.g., picture parameter set, and/or picture header), slice level (e.g., slice header), in coding tree unit (CTU) level or at coding unit (CU) level.

In one example, the rice parameter used to determine the codewords for coding abs_remainder syntax in transform skip residual coding is signaled in slice header, picture header, PPS, and/or SPS. The signaled rice parameter is used to determine the codeword for coding the syntax abs_remainder when a CU is coded as transform skip mode and the CU is associated with the above mentioned slice header, picture header, PPS and/or SPS, etc.

According to the sixth aspect of the disclosure, a set of the parameters and/or thresholds associated with the codewords determination as illustrated in the first and the second aspects are used for the syntax elements of transform coefficients coding and/or transform skip residual coding. And different sets can be used according to whether current block contains luma residual/coefficients or chroma residual/coefficients. The determined codewords are used as binarization codewords when coding the syntax elements through an entropy coder, e.g., arithmetic coding.

In one example, the codeword for abs_remainder associated with transform residual coding as used in the current VVC is used for both luma and chroma blocks, but different fixed rice parameters are used by the luma block and chroma block, respectively. (e.g., K1 for luma block, K2 for chroma block, where K1 and K2 are integer numbers)

According to the seventh aspect of the disclosure, a set of the parameters and/or thresholds associated with the codewords determination for the syntax elements of transform coefficients coding and/or transform skip residual coding are signaled into the bitstream. And different sets can be signaled for luma and chroma blocks. The determined codewords are used as binarization codewords when coding the syntax elements through an entropy coder, e.g., arithmetic coding.

The same methods explained in above aspects are also applicable to the escape value coding in palette mode, e.g., palette_escape_val.

According to the eighth aspect of the disclosure, different k-th orders of Exp-Golomb binarization may be used to derive different set of binary codewords for coding escape values in palette mode. In one example, for a given block of escape samples, the Exp-Golomb parameter used, i.e., the value of k, is determined according to the QP value of the block, denoted as $QP_{CU}$. The same example as illustrated in Table 6 can be used in deriving the value of parameter k based on a given QP value of the block. Although in that example four different threshold values (from TH1 to TH4) are listed, and five different k values (from K0 to K4) may be derived based on these threshold values and $QP_{CU}$, it is worth mentioning that the number of threshold values is for illustration purpose only. In practice, different number of threshold values may be used to partition the whole QP value range into different number of QP value segments, and for each QP value segment, a different k value may be used to derive corresponding binary codewords for coding escape values of a block which is coded in palette mode. It is also worth noting that the same logics can be implemented differently in practice. For example, certain equations, or a look-up table, may be used to derive the same rice parameters.

According to the ninth aspect of the disclosure, a set of the parameters and/or thresholds associated with the codewords determination for the syntax elements of escape sample is signaled into the bitstream. The determined codewords are used as binarization codewords when coding the syntax elements of escape samples through an entropy coder, e.g., arithmetic coding.

It is noted that the set of parameters and/or thresholds can be a full set, or a subset of all the parameters and thresholds associated with the codewords determination for the syntax elements. The set of the parameters and/or thresholds can be signaled at different levels in the video bitstream. For example, they can be signaled at sequence level (e.g., the sequence parameter set), picture level (e.g., picture parameter set, and/or picture header), slice level (e.g., slice header), in coding tree unit (CTU) level or at coding unit (CU) level.

In one example according to the aspect, the k-th orders of Exp-Golomb binarization is used to determine the codewords for coding palette_escape_val syntax in palette mode, and the value of k is signaled in bitstream to decoder. The value of k may be signaled at different levels, e.g., it may be signaled in slice header, picture header, PPS, and/or SPS, etc. The signaled Exp-Golomb parameter is used to determine the codeword for coding the syntax palette_escape_val when a CU is coded as palette mode and the CU is associated with the above mentioned slice header, picture header, PPS and/or SPS, etc.

Harmonization of the Level Mapping for Transform Skip Mode and Regular Transform Mode According to the tenth aspect of the disclosure, a same condition for applying level mapping is used for both transform skip mode and regular transform mode. In one example, it is proposed to apply the level mapping after the number of context-coded bins (CCB) exceeds limit for both transform skip mode and regular transform mode. In another example, it is proposed to apply the level mapping before the number of context-coded bins (CCB) exceeds limit for both transform skip mode and regular transform mode.

According to the eleventh aspect of the disclosure, a same method for the derivation of mapping position in level mapping is used for both transform skip mode and regular transform mode. In one example, it is proposed to apply the derivation method of mapping position in level mapping that is used under transform skip mode to the regular transform mode as well. In another example, it is proposed to apply the derivation method of mapping position in level mapping that is used under regular transform mode to the transform skip mode as well.

According to the twelfth aspect of the disclosure, a same level mapping method is applied to both transform skip mode and regular transform mode. In one example, it is proposed to apply the level mapping function that is used under transform skip mode to the regular transform mode as well. In another example, it is proposed to apply the level mapping function that is used under regular transform mode to the transform skip mode as well.

Simplification of Rice Parameter Derivation in Residual Coding

According to the thirteenth aspect of the disclosure, it is proposed to use simple logic, such as the shift or division operation, instead of lookup table for the derivation of rice parameter in coding the syntax element of abs_remainder/dec_abs_level using Golomb-Rice code. According to the current disclosure, the lookup table, as specified in Table 4, may be removed. In one example, the Rice parameter cRiceParam is derived as: cRiceParam= (locSumAbs>>n), where n is a positive number, e.g., 3. It is worth noting that in practice other different logics may be used to achieve the same results, e.g., a division operation by a value equal to 2 to the power of n. An example of the corresponding decoding process based on VVC Draft is illustrated as below, where the strikethrough font shows steps or elements deleted or removed from the decoding process.

TABLE 7

Decoding process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:

```
    locSumAbs = 0
    if( xC < (1 << log2TbWidth) − 1 ) {
       locSumAbs += AbsLevel[ xC + 1 ][ yC ]
       if( xC < (1 << log2TbWidth) − 2 )
          locSumAbs += AbsLevel[ xC + 2 ][ yC ]
       if( yC < (1 << log2TbHeight) − 1 )
          locSumAbs += AbsLevel[ xC + 1 ][ yC + 1 ]
    }
    if( yC < (1 << log2TbHeight) − 1 ) {
        locSumAbs += AbsLevel[ xC ][ yC + 1 ]
        if( yC < (1 << log2TbHeight) − 2 )
        locSumAbs += AbsLevel[ xC ][ yC + 2 ]
    }
    locSumAbs = Clip3( 0, 31, locSumAbs − baseLevel * 5 )                                  (1494)
```

Given the variable locSumAbs, the Rice parameter cRiceParam is derived as follows: *specified in Table 4.*
cRiceParam = (locSumAbs >> 3)
When baseLevel is equal to 0, the variable ZeroPos[ n ] is derived as follows:
ZeroPos[ n ] = ( QState < 2 ? 1 : 2 ) << cRiceParam According to the fourteenth aspect of the disclosure, it is proposed to use less neighbor positions for the derivation of rice parameter in coding the syntax element of abs_remainder/dec_abs_level using Golomb-Rice code. In one example, it is proposed to only use 2 neighbor positions for the derivation of rice parameter in coding the syntax element of abs_remainder/dec_abs_level. The corresponding decoding process based on VVC Draft is illustrated as below, where the strikethrough font shows steps or elements deleted or removed from the decoding process.

TABLE 8

Decoding process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:

```
    locSumAbs = 0
    if( xC < (1 << log2TbWidth) − 1 ) {
       locSumAbs += AbsLevel[ xC + 1 ][ yC ]
       if( xC < (1 << log2TbWidth) − 2 )
          locSumAbs += AbsLevel[ xC + 2 ][ yC ]
       if( yC < (1 << log2TbHeight) − 1 )
          locSumAbs += AbsLevel[ xC + 1 ][ yC + 1 ]                                         (1494)
    }
    if( yC < (1 << log2TbHeight) − 1 ) {
        locSumAbs += AbsLevel[ xC ][ yC + 1 ]
        if( yC < (1 << log2TbHeight) − 2 )
        locSumAbs += AbsLevel[ xC ][ yC + 2 ]
    }
    locSumAbs = Clip3( 0, 31, locSumAbs - baseLevel * 5 2 )
```

(strikethrough portions shown indicate deletions)
Given the variable locSumAbs, the Rice parameter cRiceParam is derived as specified in Table 4.
When baseLevel is equal to 0, the variable ZeroPos[ n ] is derived as follows:
ZeroPos[ n ] = ( QState < 2 ? 1 : 2 ) << cRiceParam In another example, it is proposed to only use one neighbor position for the derivation of rice parameter in coding the syntax element of abs_remainder/dec_abs_level. The corresponding decoding process based on VVC Draft is illustrated as below, where the strikethrough font shows steps or elements deleted or removed from the decoding process.

TABLE 9

Decoding process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
  locSumAbs = 0
  if( xC < (1 << log2TbWidth) − 1 ) {
    locSumAbs += AbsLevel[ xC + 1 ][ yC ]
    ~~if( xC < (1 << log2TbWidth) − 2 )~~
      ~~locSumAbs += AbsLevel[ xC + 2 ][ yC ]~~
    ~~if( yC < (1 << log2TbHeight) − 1 )~~
      ~~locSumAbs += AbsLevel[ xC + 1 ][ yC + 1 ]~~             (1494)
  }
  ~~if( yC < (1 << log2TbHeight) − 1 ) {~~
    ~~locSumAbs += AbsLevel[ xC ][ yC + 1 ]~~
    ~~if( yC < (1 << log2TbHeight) − 2 )~~
      ~~locSumAbs += AbsLevel[ xC ][ yC + 2 ]~~
  ~~}~~
  locSumAbs = Clip3( 0, 31, locSumAbs − baseLevel ~~* 5~~ )
Given the variable locSumAbs, the Rice parameter cRiceParam is derived as specified in Table 4.
When baseLevel is equal to 0, the variable ZeroPos[ n ] is derived as follows:
ZeroPos[ n ] = ( QState < 2 ? 1 : 2 ) << cRiceParam According to the fifteenth aspect of the disclosure, it is proposed to use different logics to adjust the value of locSumAbs based on the value of baseLevel for the derivation of rice parameter in coding the syntax element of abs_remainder/dec_abs_level using Golomb-Rice code. In one example, additional scale and offset operations are applied in the form of "(locSumAbs-baseLevel*5)*alpha+beta". When alpha takes a value of 1.5 and beta takes a value of 1, the corresponding decoding process based on VVC Draft is illustrated as below.

TABLE 10

Decoding process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
  locSumAbs = 0
  if( xC < (1 << log2TbWidth) − 1 ) {
    locSumAbs += AbsLevel[ xC + 1 ][ yC ]
    if( xC < (1 << log2TbWidth) − 2 )
      locSumAbs += AbsLevel[ xC + 2 ][ yC ]
    if( yC < (1 << log2TbHeight) − 1 )
      locSumAbs += AbsLevel[ xC + 1 ][ yC + 1 ]             (1494)
  }
  if( yC < (1 << log2TbHeight) − 1 ) {
    locSumAbs += AbsLevel[ xC ][ yC + 1 ]
    if( yC < (1 << log2TbHeight) − 2 )
      locSumAbs += AbsLevel[ xC ][ yC + 2 ]

TABLE 10-continued

| Decoding process |
|---|
| }<br>    locSumAbs = Clip3( 0, 31, (locSumAbs − baseLevel * 5) *1.5 +1 )<br>Given the variable locSumAbs, the Rice parameter cRiceParam is derived as specified in Table 4.<br>When baseLevel is equal to 0, the variable ZeroPos[ n ] is derived as follows:<br>ZeroPos[ n ] = ( QState < 2 ? 1 : 2 ) << cRiceParam |

According to the sixteenth aspect of the disclosure, it is proposed to remove clip operations for the derivation of rice parameter in the syntax element of abs_remainder/dec_abs_level using Golomb-Rice code. According to the current disclosure, an example of the decoding process on VVC Draft is illustrated as below, where the strikethrough font shows steps or elements deleted or removed from the decoding process.

TABLE 11

| Decoding process |
|---|
| Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.<br>Output of this process is the Rice parameter cRiceParam.<br>Given the array AbsLevel[ x ][ y ] for the transform block with component index cIdx and the top-left luma location ( x0, y0 ), the variable locSumAbs is derived as specified by the following pseudo code:<br>    locSumAbs = 0<br>    if( xC < (1 << log2TbWidth) − 1 ) {<br>        locSumAbs += AbsLevel[ xC + 1 ][ yC ]<br>        if( xC < (1 << log2TbWidth) − 2 )<br>            locSumAbs += AbsLevel[ xC + 2 ][ yC ]<br>        if( yC < (1 << log2TbHeight) − 1 )<br>            locSumAbs += AbsLevel[ xC + 1 ][ yC + 1 ]            (1494)<br>    }<br>    if( yC < (1 << log2TbHeight) − 1 ) {<br>        locSumAbs += AbsLevel[ xC ][ yC + 1 ]<br>        if( yC < (1 << log2TbHeight) − 2 )<br>            locSumAbs += AbsLevel[ xC ][ yC + 2 ]<br>    }<br>    locSumAbs = ~~Clip3( 0, 31,~~ locSumAbs − baseLevel * 5 )<br>Given the variable locSumAbs, the Rice parameter cRiceParam is derived as follows:~~specified in Table 4.~~<br>cRiceParam = (locSumAbs >> 3)<br>When baseLevel is equal to 0, the variable ZeroPos[ n ] is derived as follows:<br>ZeroPos[ n ] = ( QState < 2 ? 1 : 2 ) << cRiceParam |

According to the current disclosure, an example of the decoding process on VVC Draft is illustrated as below, where the strikethrough font shows steps or elements deleted or removed from the decoding process.

TABLE 12

| Decoding process |
|---|
| Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.<br>Output of this process is the Rice parameter cRiceParam.<br>Given the array AbsLevel[ x ][ y ] for the transform block with component index cIdx and the top-left luma location ( x0, y0 ), the variable locSumAbs is derived as specified by the following pseudo code:<br>    locSumAbs = 0<br>    if( xC < (1 << log2TbWidth) − 1 ) {<br>        locSumAbs += AbsLevel[ xC + 1 ][ yC ] |

TABLE 12-continued

| Decoding process |
|---|
|     if( xC < (1 << log2TbWidth) − 2 )<br>      locSumAbs += AbsLevel[ xC + 2 ][ yC ]<br>    if( yC < (1 << log2TbHeight) − 1 )<br>      locSumAbs += AbsLevel[ xC + 1 ][ yC + 1 ]            (1494)<br>  }<br>  if( yC < (1 << log2TbHeight) − 1 ) {<br>    locSumAbs += AbsLevel[ xC ][ yC + 1 ]<br>    if( yC < (1 << log2TbHeight) − 2 )<br>      locSumAbs += AbsLevel[ xC ][ yC + 2 ]<br>  }<br>  locSumAbs = ~~Clip3~~ Min( ~~0~~, 31, locSumAbs − baseLevel * 5 )<br>Given the variable locSumAbs, the Rice parameter cRiceParam is derived as specified in Table 4.<br>When baseLevel is equal to 0, the variable ZeroPos[ n ] is derived as follows:<br>ZeroPos[ n ] = ( QState < 2 ? 1 : 2 ) << cRiceParam |

According to the seventeenth aspect of the disclosure, it is proposed to change the initial value of locSumAbs from 0 to a non-zero integer for the derivation of rice parameter in coding the syntax element of abs_remainder/dec_abs_level using Golomb-Rice code. In one example, an initial value of 1 is assigned to locSumAbs, and the corresponding decoding process based on VVC Draft is illustrated as below, where the strikethrough font shows steps or elements deleted or removed from the decoding process.

TABLE 13

| Decoding process |
|---|
| Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.<br>Output of this process is the Rice parameter cRiceParam.<br>Given the array AbsLevel[ x ][ y ] for the transform block with component index cIdx and the top-left luma location ( x0, y0 ), the variable locSumAbs is derived as specified by the following pseudo code:<br>  locSumAbs = ~~0~~1<br>  if( xC < (1 << log2TbWidth) − 1 ) {<br>    locSumAbs += AbsLevel[ xC + 1 ][ yC ]<br>    if( xC < (1 << log2TbWidth) − 2 )<br>      locSumAbs += AbsLevel[ xC + 2 ][ yC ]<br>    if( yC < (1 << log2TbHeight) − 1 )<br>      locSumAbs += AbsLevel[ xC + 1 ][ yC + 1 ]            (1494)<br>  }<br>  if( yC < (1 << log2TbHeight) − 1 ) {<br>    locSumAbs += AbsLevel[ xC ][ yC + 1 ]<br>    if( yC < (1 << log2TbHeight) − 2 )<br>      locSumAbs += AbsLevel[ xC ][ yC + 2 ]<br>  }<br>  locSumAbs = Clip3( 0, 31, locSumAbs − baseLevel * 5)<br>Given the variable locSumAbs, the Rice parameter cRiceParam is derived as specified in Table 4.<br>When baseLevel is equal to 0, the variable ZeroPos[ n ] is derived as follows:<br>ZeroPos[ n ] = ( QState < 2 ? 1 : 2 ) << cRiceParam |

According to the eighteenth aspect of the disclosure, it is proposed to use the max value of neighbor position level values instead of their sum value for the derivation of rice parameter in coding the syntax element of abs_remainder/dec_abs_level using Golomb-Rice code. An example of the corresponding decoding process based on VVC Draft is illustrated as below.

TABLE 14

Decoding process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary
logarithm of the transform block height log2TbHeight.
Output of this process is the Rice parameter cRiceParam.
Given the array AbsLevel[ x ][ y ] for the transform block with component index cIdx and
the top-left luma location ( x0, y0 ), the variable locSumAbs is derived as specified by the
following pseudo code:
   locSumAbs = 0
   if( xC <(1 << log2TbWidth) − 1 ) {
     locSumAbs += Max( AbsLevel[ xC + 1 ][ yC ], locSumAbs )
     if(xC<(1 << log2TbWidth) − 2)
       locSumAbs += Max( AbsLevel[ xC + 2 ][ yC ], locSumAbs )
     if( yC<(1 << log2TbHeight) − 1)
       locSumAbs += Max( AbsLevel[ xC + 1 ][ yC + 1 ], locSumAbs )     (1494)
   }
   if( yC <(1 << log2TbHeight) − 1 ) {
     locSumAbs += Max( AbsLevel[ xC ][ yC + 1 ], locSumAbs )
     if( yC<(1 << log2TbHeight) − 2)
       locSumAbs += Max( AbsLevel[ xC ][ yC + 2 ], locSumAbs )
   }
   locSumAbs = Clip3( 0, 31, locSumAbs − baseLevel ~~* 5~~ )
Given the variable locSumAbs, the Rice parameter cRiceParam is derived as specified in Table 4.
When baseLevel is equal to 0, the variable ZeroPos[ n ] is derived as follows:
ZeroPos[ n ] = ( QState < 2 ? 1 : 2 ) << cRiceParam According to the nineteenth aspect of the disclosure, it is proposed to derive the rice parameter based on the relative amplitude of each AbsLevel value at neighboring positions and the base level value, in coding the syntax element of abs_remainder/dec_abs_level using Golomb-Rice code. In one example, the rice parameter is derived based on how many of the AbsLevel values at neighboring positions are greater than the base level. An example of the corresponding decoding process based on VVC Draft is illustrated as below, where the strikethrough font shows steps or elements deleted or removed from the decoding process.

TABLE 15

Decoding process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary
logarithm of the transform block height log2TbHeight.
Output of this process is the Rice parameter cRiceParam.
Given the array AbsLevel[ x ][ y ] for the transform block with component index cIdx and
the top-left luma location ( x0, y0 ), the variable locSumAbs is derived as specified by the
following pseudo code:
   locSumAbs = 0
   if( xC < (1 << log2TbWidth) − 1 ){
     locSumAbs += (AbsLevel[ xC + 1 ][ yC ] > baseLevel? 1:0)
     if(xC < (1 << log2TbWidth) − 2)
       locSumAbs += (AbsLevel[ xC + 2 ][ yC ] > baseLevel? 1:0)
     if( yC < (1 << log2TbHeight) − 1)
       locSumAbs += (AbsLevel[ xC + 1 ][ yC + 1 ] > baseLevel? 1:0)     (1494)
   }
   if( yC < (1 << log2TbHeight) − 1 ) {
     locSumAbs += (AbsLevel[ xC ][ yC + 1 ] > baseLevel? 1:0)
     if( yC < (1 << log2TbHeight) − 2)
       locSumAbs += (AbsLevel[ xC ][ yC + 2 ] > baseLevel? 1:0)
   }
   ~~locSumAbs = Clip3( 0, 31, locSumAbs − baseLevel * 5 )~~
Given the variable locSumAbs, the Rice parameter cRiceParam is derived as follows:~~specified in Table 4.~~
cRiceParam = locSumAbs
When baseLevel is equal to 0, the variable ZeroPos[ n ] is derived as follows:
ZeroPos[ n ] = ( QState < 2 ? 1 : 2 ) << cRiceParam In another example, the rice parameter is derived based on the sum of the (AbsLevel−baseLevel) values for those neighbor positions whose AbsLevel values are greater than the base level. An example of the corresponding decoding process based on VVC Draft is illustrated as below, where the strikethrough font shows steps or elements deleted or removed from the decoding process.

TABLE 16

| Decoding process |
| --- |
| Inputs to this process are the base level baseLevel, the colour component index cdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.<br>Output of this process is the Rice parameter cRiceParam.<br>Given the array AbsLevel[ x ][ y ] for the transform block with component index cIdx and the top-left luma location ( x0, y0 ), the variable locSumAbs is derived as specified by the following pseudo code:<br>  locSumAbs = 0<br>  if( xC <(1 << log2TbWidth) − 1 ) {<br>    locSumAbs += Max( 0, AbsLevel[ xC + 1 ][ yC ] − baseLevel)<br>    if(xC<(1 << log2TbWidth) − 2)<br>      locSumAbs += Max( 0, AbsLevel[ xC + 2 ][ yC ] − baseLevel)<br>    if( yC<(1 << log2TbHeight) − 1)<br>      locSumAbs += Max( 0, AbsLevel[ xC + 1 ][ yC + 1 ] − baseLevel)     (1494)<br>  }<br>  if( yC < (1 << log2TbHeight) − 1 ) {<br>    locSumAbs += Max( 0, AbsLevel[ xC ][ yC + 1 ] − baseLevel)<br>    if( yC < (1 << log2TbHeight) −2)<br>      locSumAbs += Max( 0, AbsLevel[ xC ][ yC + 2 ] − baseLevel)<br>  }<br>  locSumAbs = ~~Clip3~~ Min ( ~~0,~~ 31, locSumAbs ~~− baseLevel * 5~~ )<br>Given the variable locSumAbs, the Rice parameter cRiceParam is derived as specified in Table 4.<br>When baseLevel is equal to 0, the variable ZeroPos[ n ] is derived as follows:<br>ZeroPos[ n ] = ( QState < 2 ? 1 : 2 ) << cRiceParam |

According to the current disclosure, one example of the decoding process on VVC Draft is illustrated as below, where the strikethrough font shows steps or elements deleted or removed from the decoding process.

TABLE 17

| Decoding process |
| --- |
| Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.<br>Output of this process is the Rice parameter cRiceParam.<br>Given the array AbsLevel[ x ][ y ] for the transform block with component index cIdx and the top-left luma location ( x0, y0 ), the variable locSumAbs is derived as specified by the following pseudo code:<br>  locSumAbs = 0<br>  if( xC < (1 << log2TbWidth) − 1 ) {<br>    locSumAbs += AbsLevel[ xC + 1 ][ yC ] − baseLevel<br>    if(xC < (1 << log2TbWidth) − 2)<br>      locSumAbs += AbsLevel[ xC + 2 ][ yC ] − baseLevel<br>    if( yC <(1 << log2TbHeight) − 1)<br>      locSumAbs += AbsLevel[ xC + 1 ][ yC + 1 ] − baseLevel     (1494)<br>  }<br>  if( yC <(1 << log2TbHeight) − 1 ) {<br>    locSumAbs += AbsLevel[ xC ][ yC + 1 ] − baseLevel<br>    if( yC<(1 << log2TbHeight) − 2)<br>      locSumAbs += AbsLevel[ xC ][ yC + 2 ] − baseLevel<br>  } |

TABLE 17-continued

| Decoding process |
| --- |
| locSumAbs = Clip3( 0, 31, locSumAbs =~~baseLevel * 5~~ )<br>Given the variable locSumAbs, the Rice parameter cRiceParam is derived as specified in Table 4.<br>When baseLevel is equal to 0, the variable ZeroPos[ n ] is derived as follows:<br>ZeroPos[ n ] = ( QState < 2 ? 1 : 2 ) << cRiceParam |

Simplification of Level Mapping Position Derivation in Residual Coding

According to the twentieth aspect of the disclosure, it is proposed to remove QState from the derivation of ZeroPos [n] so that ZeroPos [n] is solely derived from cRiceParam. An example of the corresponding decoding process based on VVC Draft is illustrated as below, where the strikethrough font shows steps or elements deleted or removed from the decoding process.

TABLE 18

| Decoding process |
| --- |
| Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.<br>Output of this process is the Rice parameter cRiceParam.<br>Given the array AbsLevel[ x ][ y ] for the transform block with component index cIdx and the top-left luma location ( x0, y0 ), the variable locSumAbs is derived as specified by the following pseudo code:<br>  locSumAbs = 0<br>  if( xC < (1 << log2TbWidth) − 1 ) {<br>    locSumAbs += AbsLevel[ xC + 1 ][ yC ]<br>    if(xC<(1 << log2TbWidth) − 2)<br>      locSumAbs += AbsLevel[ xC + 2 ][ yC ]<br>    if(yC<(1 << log2TbHeight) − 1)<br>      locSumAbs += AbsLevel[ xC + 1 ][ yC + 1 ]            (1494)<br>  }<br>  if( yC < (1 << log2TbHeight) − 1 ) {<br>    locSumAbs += AbsLevel[ xC ][ yC + 1 ]<br>    if(yC<(1 << log2TbHeight) − 2)<br>      locSumAbs += AbsLevel[ xC ][ yC + 2 ]<br>  }<br>  locSumAbs = Clip3( 0, 31, locSumAbs − baseLevel * 5)<br>Given the variable locSumAbs, the Rice parameter cRiceParam is derived as specified in Table 4.<br>When baseLevel is equal to 0, the variable ZeroPos[ n ] is derived as follows:<br>ZeroPos[ n ] = 2 ~~( QState < 2 ? 1 : 2 )~~ << cRiceParam |

According to the twenty-first aspect of the disclosure, it is proposed to derive ZeroPos [n] based on the value of locSumAbs. An example of the corresponding decoding process based on VVC Draft is illustrated as below, where the strikethrough font shows steps or elements deleted or removed from the decoding process.

TABLE 19

| Decoding process |
| --- |
| Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.<br>Output of this process is the Rice parameter cRiceParam.<br>Given the array AbsLevel[ x ][ y ] for the transform block with component index cIdx and the top-left luma location ( x0, y0 ), the variable locSumAbs is derived as specified by the following pseudo code: |

TABLE 19-continued

| Decoding process |
| --- |

```
locSumAbs = 0
if( xC <(1 << log2TbWidth) − 1 ) {
    locSumAbs += AbsLevel[ xC + 1 ][ yC ]
    if(xC<(1 << log2TbWidth) − 2)
        locSumAbs += AbsLevel[ xC + 2 ][ yC ]
    if( yC<(1 << log2TbHeight) − 1)
        locSumAbs += AbsLevel[ xC + 1 ][ yC + 1 ]            (1494)
}
if( yC < (1 << log2TbHeight) − 1 ) {
    locSumAbs += AbsLevel[ xC ][ yC + 1 ]
    if( yC<(1 << log2TbHeight) − 2)
        locSumAbs += AbsLevel[ xC ][ yC + 2 ]
}
locSumAbs = Clip3( 0, 31, locSumAbs − baseLevel * 5)
```
Given the variable locSumAbs, the Rice parameter cRiceParam is derived as specified in Table 4.
When baseLevel is equal to 0, the variable ZeroPos[ n ] is derived as follows:
ZeroPos[ n ] = locSumAbs ~~( QState < 2 ? 1 : 2 ) << cRiceParam~~

(20)

According to the twenty-second aspect of the disclosure, it is proposed to derive ZeroPos [n] based on the value of AbsLevel of neighboring positions. In one example, ZeroPos [n] is derived based on the maximum value among of AbsLevel [xC+1] [yC] and AbsLevel [xC] [yC+1]. An example of the corresponding decoding process based on VVC Draft is illustrated as below, where the strikethrough font shows steps or elements deleted or removed from the decoding process.

TABLE 20

| Decoding process |
| --- |

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
```
locSumAbs = 0
ZeroPos[ n ] = 1
if( xC <(1 << log2TbWidth) − 1 ) {
    locSumAbs += AbsLevel[ xC + 1 ][ yC ]
    ZeroPos[ n ] = Max(AbsLevel[ xC + 1 ][ yC ], ZeroPos[ n ])
    if(xC<(1 << log2TbWidth) − 2)
        locSumAbs += AbsLevel[ xC + 2 ][ yC ]
    if( yC < (1 << log2TbHeight) − 1)
        locSumAbs += AbsLevel[ xC + 1 ][ yC + 1 ]            (1494)
}
if( yC <(1 << log2TbHeight) − 1 ) {
    locSumAbs += AbsLevel[ xC ][ yC + 1 ]
    ZeroPos[ n ] = Max( AbsLevel[ xC ][ yC + 1 ], ZeroPos[ n ])
    if( yC<(1 << log2TbHeight) − 2)
        locSumAbs += AbsLevel[ xC ][ yC + 2 ]
}
locSumAbs = Clip3( 0, 31, locSumAbs − baseLevel * 5)
```
Given the variable locSumAbs, the Rice parameter cRiceParam is derived as specified in Table 4.
When baseLevel is equal to 0, the variable ZeroPos[ n ] is derived as follows:
ZeroPos[ n ] = ZeroPos[ n ]*1.25 + 1
~~ZeroPos[ n ] = ( QState < 2 ? 1 : 2 ) << cRiceParam~~

According to the twenty-third aspect of the disclosure, it is proposed to derive both cRiceParam and ZeroPos [n] based on the maximum value of all the AbsLevel values of neighboring positions. An example of the corresponding decoding process based on VVC Draft is illustrated as below, where the strikethrough font shows steps or elements deleted or removed from the decoding process.

TABLE 21

Decoding process

Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary logarithm of the transform block height log2TbHeight.
Output of this process is the Rice parameter cRiceParam.
Given the array AbsLevel[ x ][ y ] for the transform block with component index cIdx and the top-left luma location ( x0, y0 ), the variable locSumAbs is derived as specified by the following pseudo code:
  locSumAbs = 0
  if(xC < (1 << log2TbWidth) − 1 ){
    locSumAbs = Max( AbsLevel[ xC + 1 ][ yC ], locSumAbs )
    if(xC < (1 << log2TbWidth) − 2)
      locSumAbs = Max( AbsLevel[ xC + 2 ][ yC ], locSumAbs )
    if( yC < (1 << log2TbHeight) − 1)
      locSumAbs = Max( AbsLevel[ xC + 1 ][ yC + 1 ], locSumAbs )    (1494)
  }
  if( yC < (1 << log2TbHeight) − 1 ) {
    locSumAbs = Max( AbsLevel[ xC ][ yC + 1 ], locSumAbs )
    if( yC < (1 << log2TbHeight) − 2)
      locSumAbs = Max( AbsLevel[ xC ][ yC + 2 ], locSumAbs )
  }
  locSumAbs = ~~Clip3~~ Max ( 0, ~~31,~~ locSumAbs − baseLevel ~~* 5~~ )
Given the variable locSumAbs, the Rice parameter cRiceParam is derived as follows: ~~specified in Table 4.~~
cRiceParam = Min( (locSumAbs >> 2) , 3 )
When baseLevel is equal to 0, the variable ZeroPos[ n ] is derived as follows:
ZeroPos[ n ] = locSumAbs ~~( QState < 2 ? 1 : 2 ) << cRiceParam~~

The same methods explained in above aspects are also applicable to the derivation of predCoeff in residual coding for transform skip mode. In one example, the variable predCoeff is derived as follows:

predCoeff=Max (absLeftCoeff, absAboveCoeff)+1

Residual Coding for Transform Coefficients

In this disclosure, to address the issues as pointed out in the "inefficiencies with video decoding" section, methods are provided to simplify and/or further improve the existing design of the residual coding. In general, the main features of the proposed technologies in this disclosure are summarized as follows.

First, adjust the rice parameter derivation used under regular residual coding based on current design.

Second, change the binary methods used under regular residual coding.

Third, change the rice parameter derivation used under regular residual coding.

Rice Parameter Derivation in Residual Coding Based on Current Design

According to the twenty-fourth aspect of the disclosure, it is proposed to use variable methods of rice parameter derivations for coding certain syntax elements, e.g. abs_remainder/dec_abs_level, in residual coding, and the selection is determined according to certain coded information of the current block, e.g. quantization parameter or coding bit-depth associated with the TB/CB and/or the slice/profile, and/or according to a new flag associated with the TB/CB/slice/picture/sequence level, e.g. extended_precision_processing_flag. Different methods may be used to derive the rice parameter, with some exemplar methods listed as follows.

First, cRiceParam=(cRiceParam<<a)+ (cRiceParam>> b)+c, where a, b and c are positive number, e.g. {a,b,c}={1, 1,0}. It is worth noting that in practice other different logics may be used to achieve the same results, e.g., a multiplication operation by a value equal to 2 to the power of n.

Second, cRiceParam=(cRiceParam<<a)+b, where a and b are positive number, e.g. {a,b}={1,1}. It is worth noting that in practice other different logics may be used to achieve the same results, e.g., a multiplication operation by a value equal to 2 to the power of n.

Third, cRiceParam=(cRiceParam*a)+b, where a and b are positive number, e.g. {a,b}={1.5,0}. It is worth noting that in practice other different logics may be used to achieve the same results, e.g., a multiplication operation by a value equal to 2 to the power of n.

An example of the corresponding decoding process based on VVC Draft is illustrated as below. The changes to the VVC Draft are shown in Table 22 in bold and italic font and the strikethrough font shows steps or elements deleted or removed from the decoding process. It is worth noting that the same logics can be implemented differently in practice. For example, certain equations, or a look-up table, may also be used to derive the same rice parameters, from a BitDepth value of a current CU/Sequence.

TABLE 22

Decoding process

Inputs to this process are the base level baseLevel, the colour component index cIdx, the
luma location ( x0, y0 ) specifying the top-left sample of the current transform block
relative to the top-left sample of the current picture, the current coefficient scan location
( xC, yC ), the binary logarithm of the transform block width log2TbWidth, and the binary
logarithm of the transform block height log2TbHeight, .
Output of this process is the Rice parameter cRiceParam.
Given the array AbsLevel[ x ][ y ] for the transform block with component index cIdx and
the top-left luma location ( x0, y0 ), the variable locSumAbs is derived as specified by the
following pseudo code:
    locSumAbs = 0
    if( xC < (1 << log2TbWidth) − 1 ) {
      locSumAbs += AbsLevel[ xC + 1 ][ yC ]
      if(xC < (1 << log2TbWidth) − 2)
        locSumAbs += AbsLevel[ xC + 2 ][ yC ]
      if( yC < (1 << log2TbHeight) − 1)
        locSumAbs += AbsLevel[ xC + 1 ][ yC + 1 ]         (1494)
    }
    if( yC < (1 << log2TbHeight) − 1 ) {
      locSumAbs += AbsLevel[ xC ][ yC + 1 ]
      if(yC < (1 << log2TbHeight) − 2)
        locSumAbs += AbsLevel[ xC ][ yC + 2 ]
    }
    locSumAbs = Clip 3( 0, 31, locSumAbs − baseLevel * 5 )
Given the variable locSumAbs, the Rice parameter cRiceParam is derived specified in
Table 4.
*If extended_precision_processing_flag is equal to 1, the Rice parameter cRiceParam is is
specified as below.*
  *if(BitDepth <11)*
  *{*
    *cRiceParam = cRiceParam*
  *}*
  *else if(BitDepth <13)*
  *{*
    *cRiceParam = cRiceParam + (cRiceParam >> 1)*
  *}*
  *else if(BitDepth <15)*
  *{*
    *cRiceParam = cRiceParam << 1*
  *}*
  *else*
  *{*
  *cRiceParam = cRiceParam << 1+ (cRiceParam >> 1)*
  *}*
When baseLevel is equal to 0, the variable ZeroPos[ n ] is derived as follows:
ZeroPos[ n ] = ( QState < 2 ? 1 : 2 ) << cRiceParam In another example, when BitDepth is greater than or equal to the predefined threshold (e.g., 10, 11, 12, 13, 14, 15 or 16), the Rice parameter cRiceParam is derived as: cRiceParam=(cRiceParam<<a)+ (cRiceParam>>b)+c, where a, b and c are positive number, e.g., 1. The corresponding decoding process based on VVC Draft is illustrated as below. The changes to the VVC Draft are shown in Table 23 in in bold and italic font and the strikethrough font shows steps or elements deleted or removed from the decoding process. It is worth noting that the same logics can be implemented differently in practice. For example, certain equations, or a look-up table, may also be used to derive the same rice parameters, from a BitDepth value of a current CU/Sequence.

TABLE 23

Decoding process

Inputs to this process are the base level baseLevel, the colour component index cIdx, the
luma location ( x0, y0 ) specifying the top-left sample of the current transform block
relative to the top-left sample of the current picture, the current coefficient scan location
( xC, yC ), the binary logarithm of the transform block width log2TbWidth, and the binary
logarithm of the transform block height log2TbHeight,.
Output of this process is the Rice parameter cRiceParam.
Given the array AbsLevel[ x ][ y ] for the transform block with component index cIdx and
the top-left luma location ( x0, y0 ), the variable locSumAbs is derived as specified by the
following pseudo code:
    locSumAbs = 0
    if( xC < (1 << log2TbWidth) − 1 ) {
      locSumAbs += AbsLevel[ xC + 1 ][ yC ]
      if(xC<(1 << log2TbWidth) − 2)
        locSumAbs += AbsLevel[ xC + 2 ][ yC ]
      if( yC<(1 << log2TbHeight) − 1)

TABLE 23-continued

Decoding process

```
      locSumAbs += AbsLevel[ xC + 1 ][ yC + 1 ]        (1494)
    }
    if( yC < (1 << log2TbHeight) – 1 ) {
      locSumAbs += AbsLevel[ xC ][ yC + 1 ]
      if(yC < (1 << log2TbHeight) – 2)
        locSumAbs += AbsLevel[ xC ][ yC + 2 ]
    }
    locSumAbs = Clip3( 0, 31, locSumAbs – baseLevel * 5)
Given the variable locSumAbs, the Rice parameter cRiceParam is derived specified in
Table 4.
```
*The Rice parameter cRiceParam is is specified as below.*
  *if(BitDepth <11)*
  *{*
    *cRiceParam = cRiceParam*
  *}*
  *else if(BitDepth <13)*
  *{*
    *cRiceParam = cRiceParam + (cRiceParam >> 1)*
  *}*
  *else if(BitDepth <15)*
  *{*
    *cRiceParam = cRiceParam << 1*
  *}*
  *else*
  *{*
  *cRiceParam = cRiceParam << 1+ (cRiceParam >> 1)*
  *}*
When baseLevel is equal to 0, the variable ZeroPos[ n ] is derived as follows:
ZeroPos[ n ] = ( QState < 2 ? 1 : 2 ) << cRiceParam Binary Methods in Residual Coding for Profiles Beyond 10-Bits According to the twenty-fifth aspect of the disclosure, it is proposed to use variable sets of binary codewords for coding certain syntax elements, e.g. abs_remainder/dec_abs_level, in residual coding, and the selection is determined according to certain coded information of the current block, e.g. quantization parameter or coding bit-depth associated with the TB/CB and/or the slice/profile, and/or according to a new flag associated with the TB/CB/slice/picture/sequence level, e.g. extended_precision_processing_flag. Different methods may be used to derive the variable sets of binary codewords, with some exemplar methods listed as follows.

First, the same procedure for determining the codeword for abs_remainder as used in the current VVC is used, but always with a fixed rice parameter (e.g., 2, 3, 4, 5, 6, 7 or 8) selected. The fixed value may be different in different condition according to certain coded information of the current block, e.g., quantization parameter or coding bit-depth associated with the TB/CB and/or the slice/profile, and/or according to a syntax element associated with the TB/CB/slice/picture/sequence level, e.g., rice_parameter_value. One specific example is illustrated as shown in Table 24, where TH1 to TH4 are predefined thresholds satisfying (TH1<TH2<TH3<TH4), and K0 to K4 are predefined rice parameters. It is worth noting that the same logics can be implemented differently in practice. For example, certain equations, or a look-up table, may also be used to derive the same rice parameters, as shown in Table 24, from a BitDepth value of a current CU/Sequence.

Second, fixed length binarization.

Third, truncated Rice binarization.

Fourth, truncated Binary (TB) binarization process.

Fifth, k-th order Exp-Golomb binarization process (EGk).

Sixth, limited k-th order Exp-Golomb binarization.

TABLE 24

Rice parameter determination based on bit-depth

```
if(BitDepth <TH1)
{
  rice parameter = K0
else if(BitDepth <TH2)
  rice parameter = K1
}
else if(BitDepth <TH3)
{
  rice parameter = K2
}
else if(BitDepth <TH4)
{
  rice parameter = K3
}
else
{
  rice parameter = K4
}
```

In one example, when the new flag, e.g., extended_precision_processing_flag, is equal to 1, the Rice parameter cRiceParam is fixed as n, where n is a positive number (e.g., 2, 3, 4, 5, 6, 7 or 8). The fixed value may be different in different condition. An example of the corresponding decoding process based on VVC Draft is illustrated as below. The changes to the VVC Draft are shown in Table 25 in in bold and italic font and the strikethrough font shows steps or elements deleted or removed from the decoding process.

TABLE 25

| Decoding process |
| --- |
| The rice parameter cRiceParam is derived as follows:<br>If transform_skip_flag[ x0 ][ y0 ][ cIdx ] is equal to 1 and<br>sh_ts_residual_coding_disabled_flag is equal to 0, the Rice parameter cRiceParam is<br>set equal to 1.<br>*If extended_precision_processing_flag is equal to 1, the rice parameter cRiceParam is set equal to 6.*<br>Otherwise, the rice parameter cRiceParam is derived by invoking the rice parameter<br>derivation process for abs_remainder[ ] as specified in Table 3 with the variable<br>baseLevel set equal to 4, the colour component index cIdx, the luma location (x0, y0 ),<br>the current coefficient scan location ( xC, yC ), the binary logarithm of the transform<br>block width log2TbWidth, and the binary logarithm of the transform block height<br>log2TbHeight as inputs. |

In another example, it is proposed to only use one fixed value for rice parameter in coding the syntax element of abs_remainder/dec_abs_level when the new flag, e.g., extended_precision_processing_flag, is equal to 1. The corresponding decoding process based on VVC Draft is illustrated as below. The changes to the VVC Draft are shown in Table 26 in in bold and italic font and the strikethrough font shows steps or elements deleted or removed from the decoding process.

TABLE 26

| Decoding process |
| --- |
| The rice parameter cRiceParam is derived as follows:<br>*If extended_precision_processing_flag is equal to 1, the Rice parameter cRiceParam is set equal to 7.*<br>If transform_skip_flag[ x0 ][ y0 ][ cIdx ] is equal to 1 and<br>sh_ts_residual_coding_disabled_flag is equal to 0, the Rice parameter cRiceParam is<br>set equal to 1.<br>Otherwise, the rice parameter cRiceParam is derived by invoking the rice parameter<br>derivation process for abs_remainder[] as specified in Table 3 with the variable<br>baseLevel set equal to 4, the colour component index cIdx, the luma location ( x0, y0 ),<br>the current coefficient scan location ( xC, yC ), the binary logarithm of the transform<br>block width log2TbWidth, and the binary logarithm of the transform block height<br>log2TbHeight as inputs. |

In yet another example, when BitDepth is greater than or equal to the predefined threshold (e.g., 10, 11, 12, 13, 14, 15 or 16), the Rice parameter cRiceParam is fixed as n, where n is a positive number, e.g., 4, 5, 6, 7 or 8. The fixed value may be different in different condition. An example of the corresponding decoding process based on VVC Draft is illustrated as below, where TH is a predefined threshold (e.g., 10, 11, 12, 13, 14, 15 or 16). The changes to the VVC Draft are shown in Table 27 in in bold and italic font and the strikethrough font shows steps or elements deleted or removed from the decoding process.

TABLE 27

| Decoding process |
| --- |
| The rice parameter cRiceParam is derived as follows:<br>If transform_skip_flag[ x0 ][ y0 ][ cIdx ] is equal to 1 and<br>sh_ts_residual_coding_disabled_flag is equal to 0, the Rice parameter cRiceParam is<br>set equal to 1.<br>*If BitDepth is greater than TH, the rice parameter cRiceParam is set equal to 6.*<br>Otherwise, the rice parameter cRiceParam is derived by invoking the rice parameter<br>derivation process for abs_remainder[ ]<br>as specified in Table 3 with the variable<br>baseLevel set equal to 4, the colour component index cIdx, the luma location ( x0, y0 ),<br>the current coefficient scan location ( xC, yC ), the binary logarithm of the transform<br>block width log2TbWidth, and the binary logarithm of the transform block height<br>log2TbHeight as inputs. |

In yet another example, it is proposed to only use one fixed value for rice parameter in coding the syntax element of abs_remainder/dec_abs_level when BitDepth is greater than a predefined threshold (e.g., 10, 11, 12, 13, 14, 15 or 16). The corresponding decoding process based on VVC Draft is illustrated as below, where TH is a predefined threshold (e.g., 10, 11, 12, 13, 14, 15 or 16). The changes to the VVC Draft are shown in Table 28 in in bold and italic font and the strikethrough font shows steps or elements deleted or removed from the decoding process.

TABLE 28

| Decoding process |
| --- |
| The rice parameter cRiceParam is derived as follows:<br>*If BitDepth is greater than TH, the Rice parameter cRiceParam is set equal to 7.*<br>If transform_skip_flag[ x0 ][ y0 ][ cIdx ] is equal to 1 and<br>sh ts_residual_coding_disabled_flag is equal to 0, the Rice parameter cRiceParam is set equal to 1.<br>Otherwise, the rice parameter cRiceParam is derived by invoking the rice parameter derivation process for abs_remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs. |

Rice Parameter Derivation in Residual Coding

According to the twenty-sixth aspect of the disclosure, it is proposed to use variable methods of rice parameter derivations for coding certain syntax elements, e.g. abs_remainder/dec_abs_level, in residual coding, and the selection is determined according to certain coded information of the current block, e.g. quantization parameter or coding bit-depth associated with the TB/CB and/or the slice/profile, and/or according to a new flag associated with the TB/CB/slice/picture/sequence level, e.g. extended_precision_processing_flag.

Different Methods May be Used to Derive the Rice Parameter, with Some Exemplar Methods Listed as Follows.

First, it is proposed to use counters to derive the rice parameter. The counters are determined according to the value of coded coefficient and certain coded information of the current block, e.g., component ID. One specific example, riceParameter=counter/a, where a is positive number, e.g., 4, and it maintains 2 counters (split by luma/chroma). These counters are reset to 0 at the start of each slice. Once coded, the counter is updated if this is the first coefficient coded in the sub-TU as follows:

if (coeffValue>=(3<<rice)) counter++
if (((coeffValue<<1)< (1<<riceParameter)) && (counter>0)) counter--;

Second, it is proposed to add a shift operation in derivation of the rice parameter in VVC. The shift is determined according to the value of coded coefficient. An example of the corresponding decoding process based on VVC Draft is illustrated as below, the shift is determined according to the counters of method 1. The changes to the VVC Draft are shown in Table 29 in in bold and italic font and the strikethrough font shows steps or elements deleted or removed from the decoding process.

TABLE 29

| Decoding process |
| --- |
| Inputs to this process are the base level baseLevel, the colour component index cIdx, the luma location ( x0, y0 ) specifying the top-left sample of the current transform block relative to the top-left sample of the current picture, the current coefficient scan location ( xC, yC ), the binary logarithm of the transform block width log2TbWidth, and the binary<br>logarithm of the transform block height log2TbHeight, .<br>Output of this process is the Rice parameter cRiceParam.<br>Given the array AbsLevel[ x ][ y ] for the transform block with component index cIdx and<br>the top-left luma location ( x0, y0 ), the variable locSumAbs is derived as specified by the<br>following pseudo code:<br>  *Shift= max(0, counter/4 − 2)*<br>  locSumAbs = 0<br>  if(xC < (1 << log2TbWidth) − 1 ) {<br>    locSumAbs += AbsLevel[ xC + 1 ][ yC ]<br>    if( xC < (1 << log2TbWidth) − 2 )<br>      locSumAbs += AbsLevel[ xC + 2 ][ yC ]<br>    if( yC < (1 << log2TbHeight) − 1 )<br>      locSumAbs += AbsLevel[ xC + 1 ][ yC + 1 ]    (1494)<br>  }<br>  if( yC < (1 << log2TbHeight) − 1 ) {<br>    locSumAbs += AbsLevel[ xC ][ yC + 1 ]<br>    if(yC < (1 << log2TbHeight) − 2 )<br>      locSumAbs += AbsLevel[ xC ][ yC + 2 ] |

TABLE 29-continued

Decoding process

```
}
  locSumAbs = Clip3( 0, 31, (locSumAbs - baseLevel * 5)>>Shift )
Given the variable locSumAbs, the Rice parameter cRiceParam is derived specified in
Table 4.
cRiceParam = cRiceParam+Shift
When baseLevel is equal to 0, the variable ZeroPos[ n ] is derived as follows:
ZeroPos[ n ] = ( QState < 2 ? 1 : 2 ) << cRiceParam
```

Third, it is proposed to add a shift operation in derivation of the rice parameter in VVC. The shift is determined according to certain coded information of the current block, e.g., coding bit-depth associated with the TB/CB and/or the slice profile (e.g., 14 bits profile or 16 bits profile). An example of the corresponding decoding process based on VVC Draft is illustrated as below, the shift is determined according to the counters of method 1. The changes to the VVC Draft are shown in Table 30 in bold and italic font and the strikethrough font shows steps or elements deleted or removed from the decoding process.

TABLE 30

Decoding process

```
Inputs to this process are the base level baseLevel, the colour component index cIdx, the
luma location ( x0, y0 ) specifying the top-left sample of the current transform block
relative to the top-left sample of the current picture, the current coefficient scan location
( xC, yC ), the binary logarithm of the transform block width log2TbWidth, and the binary
logarithm of the transform block height log2TbHeight, .
Output of this process is the Rice parameter cRiceParam.
Given the array AbsLevel[ x ][ y ] for the transform block with component index cIdx and
the top-left luma location ( x0, y0 ), the variable locSumAbs is derived as specified by the
following pseudo code:
  Shift= max(0, (BitDepth - 8)/2)
  locSumAbs = 0
  if( xC < (1 << log2TbWidth) - 1 ) {
    locSumAbs += AbsLevel[ xC + 1 ][ yC ]
    if(xC < (1 << log2TbWidth) - 2 )
      locSumAbs += AbsLevel[ xC + 2 ][ yC ]
    if( yC < (1 << log2TbHeight) - 1 )
      locSumAbs += AbsLevel[ xC + 1 ][ yC + 1 ]                              (1494)
  }
  if( yC < (1 << log2TbHeight) - 1 ) {
    locSumAbs += AbsLevel[ xC ][ yC + 1 ]
    if(yC < (1 << log2TbHeight) - 2 )
      locSumAbs += AbsLevel[ xC ][ yC + 2 ]
  }
  locSumAbs = Clip3( 0, 31, (locSumAbs - baseLevel * 5)>>Shift )
Given the variable locSumAbs, the Rice parameter cRiceParam is derived specified in
Table 4.
cRiceParam = cRiceParam+Shift
When baseLevel is equal to 0, the variable ZeroPos[ n ] is derived as follows:
ZeroPos[ n ] = ( QState < 2 ? 1 : 2 ) << cRiceParam
```

Residual Coding for Transform Skip

According to the twenty-seventh aspect of the disclosure, it is proposed to use variable sets of binary codewords for coding certain syntax elements, e.g. abs_remainder, in transform skip residual coding, and the selection is determined according to certain coded information of the current block, e.g. quantization parameter or coding bit-depth associated with the TB/CB and/or the slice/profile, and/or according to a new flag associated with the TB/CB/slice/picture/sequence level, e.g. extended_precision_processing_flag. Different methods may be used to derive the variable sets of binary codewords, with some exemplar methods listed as follows.

First, the same procedure for determining the codeword for abs_remainder as used in the current VVC is used, but always with a fixed rice parameter (e.g., 2, 3, 4, 5, 6, 7 or 8) selected. The fixed value may be different in different condition according to certain coded information of the current block, e.g., quantization parameter or coding bit-depth associated with the TB/CB and/or the slice/profile, and/or according to a syntax element associated with the TB/CB/slice/picture/sequence level, e.g., rice_parameter_value. One specific example is illustrated as shown in Table 7, where TH1 to TH4 are predefined thresholds satisfying (TH1<TH2<TH3<TH4), and K0 to K4 are predefined rice parameters. It is worth noting that the same logics can be implemented differently in practice. For example, certain equations, or a look-up table, may also be used to derive the same rice parameters, as shown in Table 7, from a BitDepth value of a current CU/Sequence.

Second, fixed length binarization.
Third, truncated Rice binarization.
Fourth, truncated Binary (TB) binarization process.
Fifth, k-th order Exp-Golomb binarization process (EGk).
Sixth, limited k-th order Exp-Golomb binarization.

An example of the corresponding decoding process based on VVC Draft is illustrated as below, the changes to the VVC Draft are shown in Table 31 in in bold and italic font and the strikethrough font shows steps or elements deleted or removed from the decoding process. It is worth noting that the same logics can be implemented differently in practice. For example, certain equations, or a look-up table, may also be used to derive the same rice parameters.

TABLE 31

| Decoding process |
| --- |

The rice parameter cRiceParam is derived as follows:
- *If transform_skip_flag[ x0 ][ y0 ][ cIdx ] is equal to 1 and sh_ts_residual_coding_disabled_flag is equal to 0, the derivation process for Rice parameter cRiceParam is specified as below.*

```
       if(BitDepth <11)
       {
          rice parameter = 1
       }
       else if(BitDepth <13)
       {
          rice parameter = 4
       }
       else if(BitDepth <15)
       {
          rice parameter = 6
       }
       else
       {
          rice parameter = 8
       }
```

- ~~If transform_skip_flag[ x0 ][ y0 ][ cIdx ] is equal to 1 and sh_ts_residual_coding_disabled_flag is equal to 0, the Rice parameter cRiceParam is set equal to 1.~~
- Otherwise, the rice parameter cRiceParam is derived by invoking the rice parameter derivation process for abs_remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In another example, it is proposed to only use one fixed value for rice parameter in coding the syntax element of abs_remainder when the new flag, e.g., extended_precision_processing_flag, is equal to 1. The corresponding decoding process based on VVC Draft is illustrated as below. The changes to the VVC Draft are shown in Table 32 in in bold and italic font and the strikethrough font shows steps or elements deleted or removed from the decoding process.

TABLE 32

| Decoding process |
| --- |

The rice parameter cRiceParam is derived as follows:
- *If extended_precision_processing_flag is equal to 1, transform_skip_flag[ x0 ][ y0 ][ cIdx ] is equal to 1 and sh_ts_residual_coding_disabled_flag is equal to 0, the derivation process for Rice parameter cRiceParam is specified as below.*

```
       if(BitDepth <11)
       {
          rice parameter = 1
       }
       else if(BitDepth <13)
       {
          rice parameter = 4
       }
       else if(BitDepth <15)
       {
          rice parameter = 6
       }
       else
       {
          rice parameter = 8
       }
```

- If transform_skip_flag[ x0 ][ y0 ][ cIdx ] is equal to 1 and sh_ts_residual_coding_disabled_flag is equal to 0, the Rice parameter cRiceParam is set equal to 1.
- Otherwise, the rice parameter cRiceParam is derived by invoking the rice parameter derivation process for abs_remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In yet another example, when the new flag, e.g., extended_precision_processing_flag, is equal to 1, the Rice parameter cRiceParam is fixed as n, where n is a positive number (e.g., 2, 3, 4, 5, 6, 7 or 8). The fixed value may be different in different condition. An example of the corresponding decoding process based on VVC Draft is illustrated as below. The changes to the VVC Draft are shown in Table 33 in in bold and italic font and the strikethrough font shows steps or elements deleted or removed from the decoding process.

TABLE 33

Decoding process

The rice parameter cRiceParam is derived as follows:
- *If extended_precision_processing_flag is equal to 1, transform_skip_flag[ x0 ][ y0 ][ cIdx ] is equal to 1 and sh_ts_residual_coding_disabled_flag is equal to 0, the Rice parameter cRiceParam is set equal to 7.*
- If transform skip flag[ x0 ][ y0 ][ cIdx ] is equal to 1 and sh_ts_residual_coding_disabled_flag is equal to 0, the Rice parameter cRiceParam is set equal to 1.
- Otherwise, the rice parameter cRiceParam is derived by invoking the rice parameter derivation process for abs remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In yet another example, when BitDepth is greater than or equal to the predefined threshold (e.g., 10, 11, 12, 13, 14, 15 or 16), the Rice parameter cRiceParam is fixed as n, where n is a positive number, e.g., 4, 5, 6, 7 or 8. The fixed value may be different in different condition. An example of the corresponding decoding process based on VVC Draft is illustrated as below, where TH is a predefined threshold (e.g., 10, 11, 12, 13, 14, 15 or 16). The changes to the VVC Draft are shown in Table 34 in in bold and italic font and the strikethrough font shows steps or elements deleted or removed from the decoding process.

TABLE 34

Decoding process

The rice parameter cRiceParam is derived as follows:
- *If BitDepth is greater than TH, transform_skip_flag [ x0 ][ y0 ][ cIdx ] is equal to 1 and sh_ts_residual_coding_disabled_flag is equal to 0, the Rice parameter cRiceParam is set equal to 7.*
- If transform_skip_flag[ x0 ][ y0 ][ cIdx ] is equal to 1 and sh_ts_residual_coding_disabled_flag is equal to 0, the Rice parameter cRiceParam is set equal to 1.
- Otherwise, the rice parameter cRiceParam is derived by invoking the rice parameter derivation process for abs_remainder[ ] as specified in Table 3 with the variable baseLevel set equal to 4, the colour component index cIdx, the luma location ( x0, y0 ), the current coefficient scan location ( xC, yC ), the binary logarithm of the transform block width log2TbWidth, and the binary logarithm of the transform block height log2TbHeight as inputs.

In yet another example, one control flag is signaled in slice header to indicate whether the signaling of Rice parameter for the transform skip blocks is enabled or disabled. When the control flag is signaled as enabled, one syntax element is further signaled for each transform skip slice to indicate the Rice parameter of that slice. When the control flag is signaled as disabled (e.g. set equal to "0"), no further syntax element is signaled at lower level to indicate the Rice parameter for the transform skip slice and a default Rice parameter (e.g. 1) is used for all the transform skip slice. An example of the corresponding decoding process based on VVC Draft is illustrated as below, where TH is a predefined value (e.g. 0, 1, 2). The changes to the VVC Draft are shown in Table 35 in in bold and italic font and the strikethrough font shows steps or elements deleted or removed from the decoding process. It is worth noting that the sh_ts_residual_coding_rice_index can be coded in different ways and/or may have the maximum value. For example, u(n), unsigned integer using n bits, or f(n), fixed-pattern bit string using n bits written (from left to right) with the left bit first, may also be used to encode/decode the same syntax element.

TABLE 35

Slice Header Syntax

| slice_header( ) { | Descriptor |
|---|---|
| ... | |
| if( sps_transform_skip_enabled_flag && !sh_dep_quant_used_flag && !sh_sign_data_hiding_used_flag ) | |
|   sh_ts_residual_coding_disabled_flag | u(1) |
| *if(!sh_ts_residual_coding_disabled_flag )* { | |
|   *sh_ts_residual_coding_rice_flag* | *u(1)* |
|   *if(sh_ts_residual_coding_rice_flag )* | |
|     *sh_ts_residual_coding_rice_index* | *ue(v)* |
| } | |
| ... | | sh_ts_residual_coding_rice_flag equal to 1 specifies that sh_ts_residual_coding_rice_index could be present in the current slice. sh_ts_residual_coding_rice_flag equal to 0 specifies that sh_ts_residual_coding_rice_index is not present in the current slice. When sh_ts_residual_coding_rice_flag is not present, the value of sh_ts_residual_coding_rice_flag is inferred to be equal to 0.

sh_ts_residual_coding_rice_index specifies the rice parameter used for the residual_ts_coding ( ) syntax structure.

TABLE 36

Decoding process

The rice parameter cRiceParam is derived as follows:
- *If sh_ts_residual_coding_rice_flag is equal to 1,*
  *transform_skip_flag[ x0 ][ y0 ][ cIdx ] is equal to 1 and*
  *sh_ts_residual_coding_disabled_flag is equal to 0, the Rice parameter cRiceParam is*
  *set equal to (sh_ts_residual_coding_rice_index+TH).*
- If transform_skip_flag[ x0 ][ y0 ][ cIdx ] is equal to 1 and
  sh_ts_residual_coding_disabled_flag is equal to 0, the Rice parameter cRiceParam is
  set equal to 1.
- Otherwise, the rice parameter cRiceParam is derived by invoking the rice parameter
  derivation process for abs_remainder[ ] as specified in Table 3 with the variable
  baseLevel set equal to 4, the colour component index cIdx, the luma location ( x0, y0 ),
  the current coefficient scan location ( xC, yC ), the binary logarithm of the transform
  block width log2TbWidth, and the binary logarithm of the transform block height
  log2TbHeight as inputs.

Figure 16:
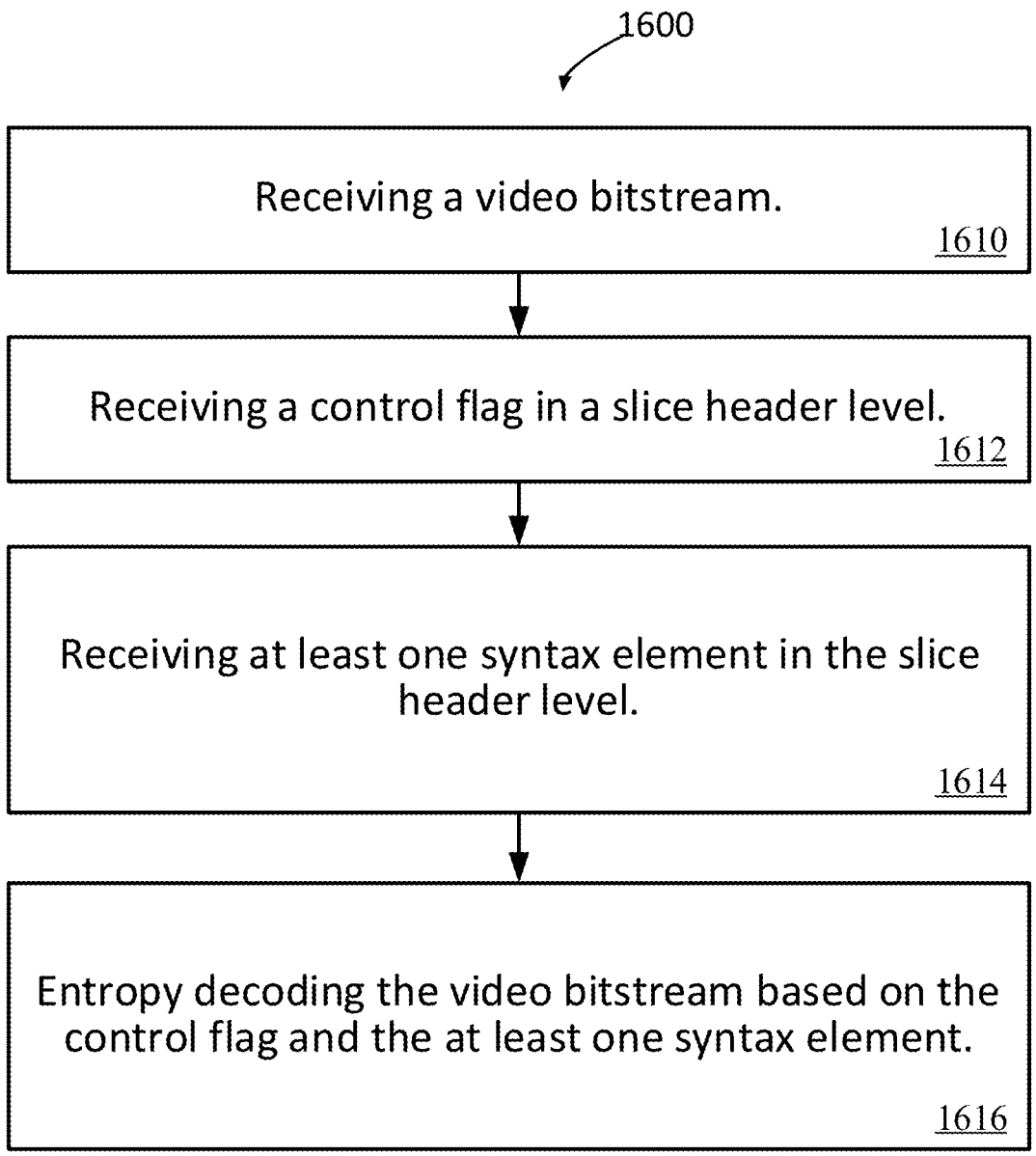
FIG. 16 is a method for decoding a video signal, according to an example of the present disclosure.

FIG. 16 shows a method for video decoding. The method may be, for example, applied to a decoder.

In step 1610, the decoder may receive a video bitstream. The video bitstream may include an encoded video information and information for decoding the encoded video information.

In step 1612, the decoder may receive a control flag in a slice header level. The control flag may signal whether a rice parameter is enabled for a transform skip slice. For example, the control flag may be used to decode the encoded video information and the rice parameter may be used to decode the syntax of abs_remainder and dec_abs_level.

In step 1614, the decoder may receive at least one syntax element in the slice header level. The at least one syntax element may be signaled for the transform skip slice and indicates the rice parameter. For example, a syntax element may be signaled for each transform skip slice to indicate the Rice parameter of that slice. In another example, when a syntax element is not signaled at lower level to indicate the Rice parameter for the transform skip slice, a default Rice parameter is used for all the transform skip slice.

In step 1616, the decoder may entropy decode the video bitstream based on the control flag and the at least one syntax element. For example, the decoder may use the control flag and the at least one syntax element to derive quantized coefficient levels and prediction-related information for decoding the encoded video information.

The entropy coding of quantization indexes for transform/transform-skip blocks may be referred to as transform/transform-skip coefficient coding.

In one or more embodiments, an encoder may determine that a residual coding disabled flag is equal to 0. The encoder may also signal a residual coding rice flag. The at least one syntax element may include the residual coding rice flag. The encoder may also determine that the residual coding rice flag is equal to 1. The encoder may further signal a residual coding rice index flag. The at least one syntax element includes the residual coding rice index flag.

In one or more embodiments, a decoder may determine that a residual coding disabled flag is equal to 0. The decoder may receive a residual coding rice flag. The at least one syntax element may include the residual coding rice flag. The decoder may also determine that the residual coding rice flag is equal to 1. The decoder may further receive a residual coding rice index flag. The at least one syntax element includes the residual coding rice index flag.

In yet another example, one control flag is signaled in sequence parameter set (or in sequence parameter set range extensions syntax) to indicate whether the signaling of Rice parameter for the transform skip blocks is enabled or disabled. When the control flag is signaled as enabled, one syntax element is further signaled for each transform skip slice to indicate the Rice parameter of that slice. When the control flag is signaled as disabled (e.g. set equal to "0"), no further syntax element is signaled at lower level to indicate the Rice parameter for the transform skip slice and a default Rice parameter (e.g. 1) is used for all the transform skip slice. An example of the corresponding decoding process based on VVC Draft is illustrated as below, where TH is a predefined value (e.g. 0, 1, 2). The changes to the VVC Draft are shown in Table 37 in in bold and italic font and the strikethrough font shows steps or elements deleted or removed from the decoding process. It is worth noting that the sh_ts_residual_coding_rice_idx can be coded in different ways and/or may have the maximum value. For example, u (n), unsigned integer using n bits, or f (n), fixed-pattern bit string using n bits written (from left to right) with the left bit first, may also be used to encode/decode the same syntax element.

TABLE 37

| Sequence Parameter Set RBSP Syntax | |
|---|---|
| seq_parameter_set_rbsp( ) { <br> ... <br>   sps_sign_data_hiding_enabled_flag <br>   *sps_ts_residual_coding_rice_present_in_sh_flag* <br>   sps_virtual_boundaries_enabled_flag <br> ... <br> } | Descriptor <br><br> u(1) <br> *u(1)* <br> u(1) | sps_ts_residual_coding_rice_present_in_sh_flag equal to 1 specifies that sh_ts_residual_coding_rice_idx could be present in SH syntax structures referring to the SPS. sps_ts_residual_coding_rice_present_in_sh_flag equal to 0 specifies that sh_ts_residual_coding_rice_idx is not present in SH syntax structures referring to the SPS. When sps_ts_residual_coding_rice_present_in_sh flag is not present, the value of sps_ts_residual_coding_rice_present_in_sh_flag is inferred to be equal to 0.

TABLE 38

| Slice Header Syntax | |
|---|---|
| slice_header( ) { <br> ... <br>   if( sps_transform_skip_enabled_flag && !sh_dep_quant_used_flag && <br>     !sh_sign_data_hiding_used_flag ) <br>     sh_ts_residual_coding_disabled_flag <br>     *if((!sh_ts_residual_coding_disabled_flag) &&* <br>   *sps_ts_residual_coding_rice_enabled_flag )* <br>     *sh_ts_residual_coding_rice_idx* <br> ... <br> } | Descriptor <br><br><br><br> u(1) <br><br><br> *ue(v)* | sh_ts_residual_coding_rice_idx specifies the rice parameter used for the residual_ts_coding ( ) syntax structure.

TABLE 39

| Decoding process |
| --- |
| The rice parameter cRiceParam is derived as follows:<br>- *If sps_ts_residual_coding_rice_flag is equal to 1,*<br>  *transform_skip_flag[ x0 ][ y0 ][ cIdx ] is equal to 1 and*<br>  *sh_ts_residual_coding_disabled_flag is equal to 0, the Rice parameter cRiceParam is*<br>  *set equal to (sh_ts_residual_coding_rice_idx+TH).*<br>- If transform_skip_flag[ x0 ][ y0 ][ cIdx ] is equal to 1 and<br>  sh_ts_residual_coding_disabled_flag is equal to 0, the Rice parameter cRiceParam is<br>  set equal to 1.<br>- Otherwise, the rice parameter cRiceParam is derived by invoking the rice parameter<br>  derivation process for abs_remainder[ ] as specified in Table 3 with the variable<br>  baseLevel set equal to 4, the colour component index cIdx, the luma location ( x0, y0 ),<br>  the current coefficient scan location ( xC, yC ), the binary logarithm of the transform<br>  block width log2TbWidth, and the binary logarithm of the transform block height<br>  log2TbHeight as inputs. |

In yet another example, one syntax element is signaled for each transform skip slice to indicate the Rice parameter of that slice. An example of the corresponding decoding process based on VVC Draft is illustrated as below. The changes to the VVC Draft are shown in Table 40 in in bold and italic font and the strikethrough font shows steps or elements deleted or removed from the decoding process. It is worth noting that the sh_ts_residual_coding_rice_idx can be coded in different ways and/or may have the maximum value. For example, u (n), unsigned integer using n bits, or f (n), fixed-pattern bit string using n bits written (from left to right) with the left bit first, may also be used to encode/decode the same syntax element.

TABLE 40

| Slice Header Syntax | |
| --- | --- |
| slice_header( ) { | Descriptor |
| ... | |
|   if( sps_transform_skip_enabled_flag && !sh_dep_quant_used_flag &&<br>    !sh_sign_data_hiding_used_flag ) | |
|     sh_ts_residual_coding_disabled_flag | u(1) |
|   *if(!sh_ts_residual_coding_disabled_flag)* | |
|     *sh_ts_residual_coding_rice_idx* | *ue(v)* |
| ... | |
| } | | sh_ts_residual_coding_rice_idx specifies the rice parameter used for the residual_ts_coding ( ) syntax structure. When sh_ts_residual_coding_rice_idx is not present, the value of sh_ts_residual_coding_rice_idx is inferred to be equal to 0.

TABLE 41

| Decoding process |
| --- |
| The rice parameter cRiceParam is derived as follows:<br>- If transform_skip_flag[ x0 ][ y0 ][ cIdx ] is equal to 1 and<br>  sh_ts_residual_coding_disabled_flag is equal to 0, the Rice parameter cRiceParam is<br>  set equal to sh_ts_residual_coding_rice_idx+1.<br>- Otherwise, the rice parameter cRiceParam is derived by invoking the rice parameter<br>  derivation process for abs_remainder[ ] as specified in Table 3 with the variable<br>  baseLevel set equal to 4, the colour component index cIdx, the luma location ( x0, y0 ),<br>  the current coefficient scan location ( xC, yC ), the binary logarithm of the transform<br>  block width log2TbWidth, and the binary logarithm of the transform block height<br>  log2TbHeight as inputs. |

Figure 17:
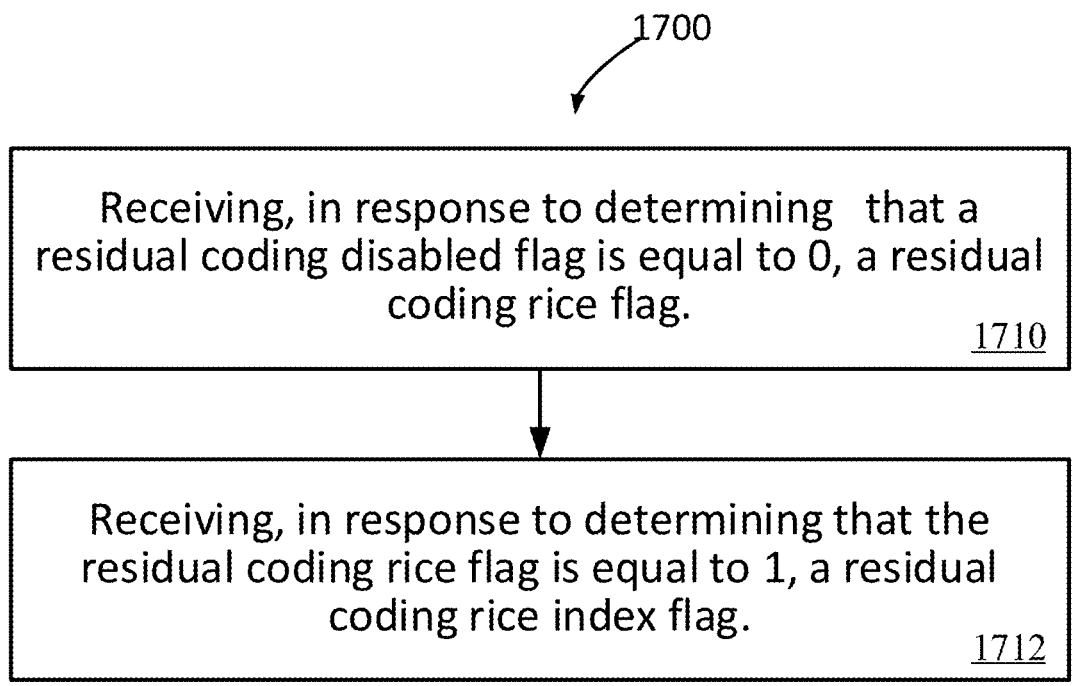
FIG. 17 is a method for decoding a video signal, according to an example of the present disclosure.

FIG. 17 shows a method for video decoding. The method may be, for example, applied to a decoder.

In step 1710, the decoder may receive, in response to determining that a residual coding disabled flag is equal to 0, a residual coding rice flag. The at least one syntax element includes the residual coding rice flag.

In step 1712, the decoder may receive, in response to determining that the residual coding rice flag is equal to 1, a residual coding rice index flag. The at least one syntax element includes the residual coding rice index flag.

In yet another example, one control flag is signaled in picture parameter set range extensions syntax to indicate whether the signaling of Rice parameter for the transform skip blocks is enabled or disabled. When the control flag is signaled as enabled, one syntax element is further signaled to indicate the Rice parameter of that picture. When the control flag is signaled as disabled (e.g. set equal to "0"), no further syntax element is signaled at lower level to indicate the Rice parameter for the transform skip slice and a default Rice parameter (e.g. 1) is used for all the transform skip slice. An example of the corresponding decoding process based on VVC Draft is illustrated as below, where TH is a predefined value (e.g. 0, 1, 2). The changes to the VVC Draft are shown in Table 42 in in bold and italic font and the strikethrough font shows steps or elements deleted or removed from the decoding process. It is worth noting that the pps_ts_residual_coding_rice_idx can be coded in different ways and/or may have the maximum value. For example, u (n), unsigned integer using n bits, or f (n), fixed-pattern bit string using n bits written (from left to right) with the left bit first, may also be used to encode/decode the same syntax element.

TABLE 42

| Picture Parameter Set Range Extensions Syntax | |
|---|---|
| pps_range_extensions( ) { | Descriptor |
| ... | |
| *pps_ts_residual_coding_rice_flag* | *u(1)* |
| *if(pps_ts_residual_coding_rice_flag )* | |
| *pps_ts_residual_coding_rice_idx* | *ue(v)* |
| } | |
| ... | | pps_ts_residual_coding_rice_flag equal to 1 specifies that pps_ts_residual_coding_rice_index could be present in the current picture. pps_ts_residual_coding_rice_flag equal to 0 specifies that pps_ts_residual_coding rice_idx is not present in the current picture. When pps_ts_residual_coding_rice_flag is not present, the value of pps_ts_residual_coding_rice_flag is inferred to be equal to 0.

pps_ts_residual_coding_rice_idx specifies the rice parameter used for the residual_ts_coding ( ) syntax structure.

TABLE 43

| Decoding process |
|---|
| The rice parameter cRiceParam is derived as follows:<br>- *If pps_ts_residual_coding_rice_flag is equal to 1,*<br>  *transform_skip_flag[ x0 ][ y0 ][ cIdx ] is equal to 1 and*<br>  *sh_ts_residual_coding_disabled_flag is equal to 0, the Rice parameter cRiceParam is*<br>  *set equal to (pps_ts_residual_coding_rice_idx+TH).*<br>- If transform_skip_flag[ x0 ][ y0 ][ cIdx ] is equal to 1 and<br>  sh_ts_residual_coding_disabled_flag is equal to 0, the Rice parameter cRiceParam is<br>  set equal to 1.<br>- Otherwise, the rice parameter cRiceParam is derived by invoking the rice parameter<br>  derivation process for abs_remainder[ ] as specified in Table 3 with the variable<br>  baseLevel set equal to 4, the colour component index cIdx, the luma location ( x0, y0 ),<br>  the current coefficient scan location ( xC, yC ), the binary logarithm of the transform<br>  block width log2TbWidth, and the binary logarithm of the transform block height<br>  log2TbHeight as inputs. |

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact examples described above and illustrated in the accompanying drawings, and that various modifications and changes can be made without departing from the scope thereof.

Figure 18:
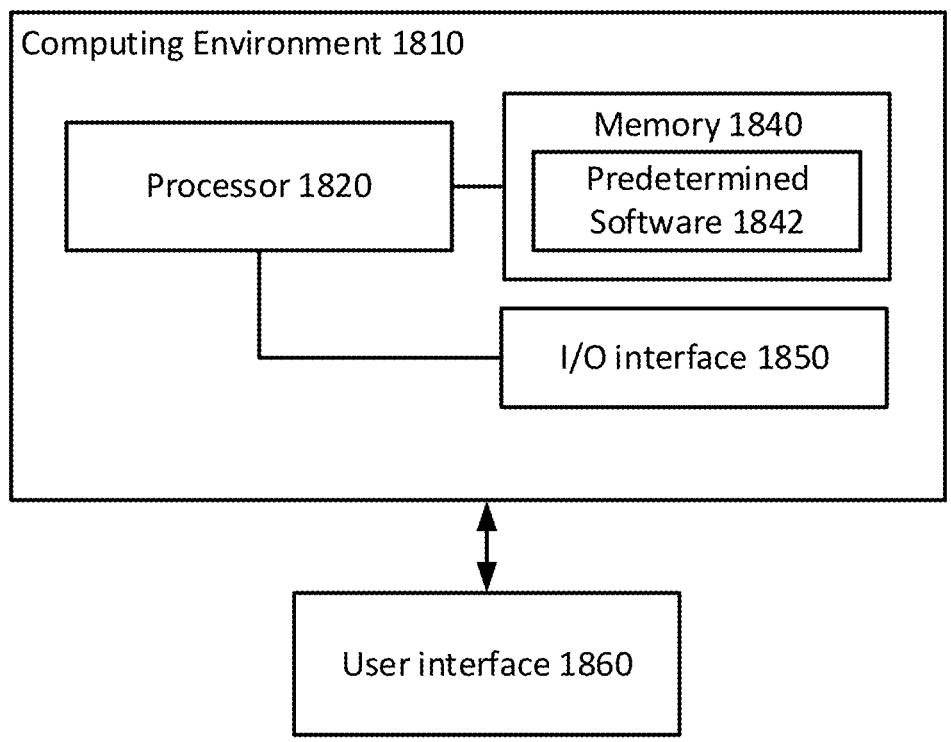
FIG. 18 is a diagram illustrating a computing environment coupled with a user interface, according to an example of the present disclosure.

FIG. 18 shows a computing environment 1810 coupled with a user interface 1860. The computing environment 1810 can be part of a data processing server. The computing environment 1810 includes processor 1820, memory 1840, and I/O interface 1850.

The processor 1820 typically controls overall operations of the computing environment 1810, such as the operations associated with the display, data acquisition, data communications, and image processing. The processor 1820 may include one or more processors to execute instructions to perform all or some of the steps in the above-described methods. Moreover, the processor 1820 may include one or more modules that facilitate the interaction between the processor 1820 and other components. The processor may be a Central Processing Unit (CPU), a microprocessor, a single chip machine, a GPU, or the like.

The memory 1840 is configured to store various types of data to support the operation of the computing environment 1810. Memory 1840 may include predetermined software 1842. Examples of such data include instructions for any applications or methods operated on the computing environment 1810, video datasets, image data, etc. The memory 1840 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 1850 provides an interface between the processor 1820 and peripheral interface modules, such as a keyboard, a click wheel, buttons, and the like. The buttons may include but are not limited to, a home button, a start scan button, and a stop scan button. The I/O interface 1850 can be coupled with an encoder and decoder.

In some embodiments, there is also provided a non-transitory computer-readable storage medium comprising a plurality of programs, such as comprised in the memory 1840, executable by the processor 1820 in the computing environment 1810, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 1810 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video decoding, comprising:
receiving, by a decoder, a video bitstream;
receiving, by the decoder, a control flag in a slice header level, wherein the control flag is used to determine whether at least one syntax element related to a rice parameter is signaled for a slice, wherein the control flag is a residual coding disabled flag, and wherein the at least one syntax element comprises a syntax element related to a residual coding rice index;
in response to determining that the at least one syntax element is signaled, receiving, by the decoder, the at least one syntax element in the slice header level, wherein the at least one syntax element is used to determine the rice parameter; and
entropy decoding, by the decoder, the video bitstream based on the control flag and the at least one syntax element.

2. The method of claim 1, further comprising:
receiving, by the decoder, a residual coding rice flag in a Sequence Picture Set (SPS) level;
wherein receiving, by the decoder, the at least one syntax element in the slice header level comprises:
in response to determining that the residual coding disabled flag is equal to 0 and the residual coding rice flag is equal to 1, receiving the syntax element related to the residual coding rice index.

3. The method of claim 2, further comprising:
in response to determining that the residual coding rice flag is equal to 1, determining, by the decoder, that the residual coding rice flag indicates that the syntax element related to the residual coding rice index is present in a current slice.

4. The method of claim 2, further comprising:
in response to determining that the residual coding rice flag is equal to 0, determining, by the decoder, that the residual coding rice flag indicates that the syntax element related to the residual coding rice index is not present in a current slice.

5. The method of claim 4, further comprising:
in response to determining that the residual coding rice flag is not present, inferring a value of the residual coding rice flag to be equal to 0.

6. The method of claim 2, further comprising:
setting, by the decoder, the rice parameter to be equal to a value of the syntax element related to the residual coding rice index plus a predefined value in response to determining that the residual coding rice flag is equal to 1, a transform skip flag is equal to 1, and the residual coding disabled flag is equal to 0.

7. The method of claim 2, further comprising:
setting, by the decoder, the rice parameter to be equal to a value of the syntax element related to the residual coding rice index plus 1 in response to determining that a transform skip flag is equal to 1 and the residual coding disabled flag is equal to 0.

8. A computing device for video decoding, comprising:
one or more processors; and
a non-transitory computer-readable storage medium storing instructions executable by the one or more processors, wherein the one or more processors are configured to perform operations comprising:
receiving a video bitstream;
receiving a control flag in a slice header level, wherein the control flag is used to determine whether at least one syntax element related to a rice parameter is signaled for a slice, wherein the control flag is a residual coding disabled flag, and wherein the at least one syntax element comprises a syntax element related to a residual coding rice index;

in response to determining that the at least one syntax element is signaled, receiving the at least one syntax element in the slice header level, wherein the at least one syntax element is used to determine the rice parameter; and entropy decoding the video bitstream based on the control flag and the at least one syntax element.

9. The device of claim 8, wherein the one or more processors are configured to perform operations further comprising:

receiving a residual coding rice flag in a Sequence Picture Set (SPS) level;

wherein receiving the at least one syntax element in the slice header level comprises:

in response to determining that the residual coding disabled flag is equal to 0 and the residual coding rice flag is equal to 1, receiving the syntax element related to the residual coding rice index.

10. The device of claim 9, wherein the one or more processors are configured to perform operations further comprising:

in response to determining that the residual coding rice flag is equal to 1, determining that the residual coding rice flag indicates that the syntax element related to the residual coding rice index is present in a current slice.

11. The device of claim 9, wherein the one or more processors are configured to perform operations further comprising:

in response to determining that the residual coding rice flag is equal to 0, determining that the residual coding rice flag indicates that the syntax element related to the residual coding rice index flag is not present in a current slice.

12. The device of claim 11, wherein the one or more processors are configured to perform operations further comprising:

in response to determining that the residual coding rice flag is not present, inferring a value of the residual coding rice flag to be equal to 0.

13. The device of claim 9, wherein the one or more processors are configured to perform operations further comprising:

setting the rice parameter to be equal to a value of the syntax element related to the residual coding rice index plus a predefined value in response to determining that the residual coding rice flag is equal to 1, a transform skip flag is equal to 1, and the residual coding disabled flag is equal to 0.

14. The device of claim 9, wherein the one or more processors are configured to perform operations further comprising:

setting the rice parameter to be equal to a value of the syntax element related to the residual coding rice index plus 1 in response to determining that a transform skip flag is equal to 1 and the residual coding disabled flag is equal to 0.

15. A non-transitory computer-readable storage medium storing a plurality of programs for execution by a computing device for video decoding having one or more processors, wherein the plurality of programs, when executed by the one or more processors, cause the computing device to perform operations comprising:

receiving a video bitstream;

receiving a control flag in a slice header level, wherein the control flag is used to determine whether at least one syntax element related to a rice parameter is signaled for a slice, wherein the control flag is a residual coding disabled flag, and wherein the at least one syntax element comprises a syntax element related to a residual coding rice index;

in response to determining that the at least one syntax element is signaled, receiving the at least one syntax element in the slice header level, wherein the at least one syntax element is used to determine the rice parameter; and entropy decoding the video bitstream based on the control flag and the at least one syntax element.

16. The medium of claim 15, wherein the plurality of programs cause the computing device to perform operations further comprising:

receiving a residual coding rice flag in a Sequence Picture Set (SPS) level;

wherein receiving the at least one syntax element in the slice header level comprises:

in response to determining that the residual coding disabled flag is equal to 0 and the residual coding rice flag is equal to 1, receiving the syntax element related to the residual coding rice index.

17. The medium of claim 16, wherein the plurality of programs cause the computing device to perform operations further comprising:

in response to determining that the residual coding rice flag is equal to 1, determining that the residual coding rice flag indicates that the syntax element related to the residual coding rice index is present in a current slice.

18. The medium of claim 16, wherein the plurality of programs cause the computing device to perform operations further comprising:

in response to determining that the residual coding rice flag is equal to 0, the residual coding rice flag indicates that the syntax element related to the residual coding rice index is not present in a current slice.

19. The medium of claim 18, wherein the plurality of programs cause the computing device to perform operations further comprising:

in response to determining that the residual coding rice flag is not present, inferring a value of the residual coding rice flag to be equal to 0.

20. The medium of claim 16, wherein the plurality of programs cause the computing device to perform operations further comprising:

setting the rice parameter to be equal to a value of the syntax element related to the residual coding rice index flag plus a predefined value in response to determining that the residual coding rice flag is equal to 1, a transform skip flag is equal to 1, and the residual coding disabled flag is equal to 0.

* * * * *